United States Patent
Aoki et al.

(10) Patent No.: US 6,731,715 B2
(45) Date of Patent: May 4, 2004

(54) REACTOR VESSEL HANDLING METHOD

(75) Inventors: Masataka Aoki, Hitachi (JP); Kouichi Ushiroda, Hitachi (JP); Takahiro Adachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/278,904

(22) Filed: Oct. 24, 2002

(65) Prior Publication Data

US 2003/0043953 A1 Mar. 6, 2003

Related U.S. Application Data

(62) Division of application No. 10/069,581, filed as application No. PCT/JP00/01100 on Feb. 25, 2000, now Pat. No. 6,625,245.

(51) Int. Cl.$^7$ ................................................ G21C 19/00
(52) U.S. Cl. ....................................... 376/260; 376/262
(58) Field of Search ................................ 376/260–264; 212/71, 312; 294/85, 906

(56) References Cited

U.S. PATENT DOCUMENTS

| | | | | |
|---|---|---|---|---|
| 3,784,028 A | * | 1/1974 | Stewart | 212/326 |
| 3,793,145 A | * | 2/1974 | Jordan et al. | 376/293 |
| 3,854,592 A | * | 12/1974 | Mordre | 212/226 |
| 4,768,442 A | * | 9/1988 | Miller | 104/106 |
| 5,318,335 A | * | 6/1994 | Ehrlich | 294/68.1 |
| 5,970,109 A | * | 10/1999 | Meier-Hynek et al. | 376/260 |

FOREIGN PATENT DOCUMENTS

| | | |
|---|---|---|
| JP | 6-102398 | 4/1994 |
| JP | 8-43577 | 2/1996 |
| JP | 8-62368 | 3/1996 |
| JP | 9-145882 | 6/1997 |
| JP | 10-39077 | 2/1998 |
| JP | 10-282283 | 10/1998 |
| JP | 11-84052 | 3/1999 |
| JP | 11-311693 | 11/1999 |

* cited by examiner

Primary Examiner—Michael J. Carone
Assistant Examiner—Daniel Matz
(74) Attorney, Agent, or Firm—Mattingly, Stanger & Malur, P.C.

(57) ABSTRACT

One of methods for carrying out a reactor vessel according to the present invention comprises the steps of removing an overhead traveling crane in a reactor containment vessel of a pressurized water reactor, or the steps of, in an area where an overhead traveling crane is installed, operating the overhead traveling crane to move aside for creating a space, through which the reactor vessel is able to pass, and then carrying out the reactor vessel through an opening provided in a top portion of the reactor containment vessel. With the present method, the reactor vessel of the pressurized water reactor can be carried out in a short time with high efficiency.

18 Claims, 23 Drawing Sheets

REACTOR VESSEL HANDLING METHOD

This is a divisional application of U.S. Ser. No. 10/069,581, filed May 14, 2002, now U.S. Pat. No. 6,625,245, which is a 371 of PCT/JP00/01100, filed Feb. 25, 2000.

TECHNICAL FIELD

The present invention relates to methods for carrying in and out a reactor vessel, which are employed in a pressurized water reactor (hereinafter abbreviated to a "PWR") for work of, e.g., carrying out a reactor vessel when the reactor vessel is to be replaced or decommissioned.

BACKGROUND ART

A reactor vessel is the most important equipment in a nuclear power plant. The service period of a nuclear power plant generally depends on the lifetimes of a reactor vessel and various units of auxiliary equipment installed inside and outside the reactor vessel. Also, when the service period of a nuclear power plant is expired, the nuclear power plant must be dismantled and decommissioned. In such an environment, it is important to prolong the service period of an existing old nuclear power plant that has been operated for relatively long years and is still now in commission.

In an existing old nuclear power plant, the plant has been refreshed or rejigged by repair and replacement of equipment other than a reactor vessel and core internals. For further prolongation of the service period, however, there has arisen the necessity of repairing and replacing the reactor vessel and the core internals as well.

In fact, replacement of core internals is already implemented in a boiling water reactor (BWR). Also, replacement of a reactor-vessel upper lid is already implemented in a PWR. From that background, establishing techniques for replacement of a reactor vessel including core internals has been required as one measure of preventive maintenance for an existing old nuclear power plant. In those techniques, it is important to make a plant downtime as short as possible.

As first prior art, methods for carrying out a reactor vessel are disclosed in Japanese Unexamined Patent Application Publication Nos. 8-62368 and 9-145882. However, those prior-art methods are concerned with carrying-out of a reactor pressure vessel of a BWR, and cannot be directly applied to carrying-out of a pressure vessel of a PWR.

Japanese Unexamined Patent Application Publication No. 11-84052 discloses, as second prior art, a method for carrying out core internals of a PWR through a space left around a girder for a polar crane (overhead traveling crane). This prior art can be applied to carrying-out of core internals, but not to carrying-out of a reactor vessel. The reasons why the above prior art cannot be applied to carrying-out of a reactor vessel reside in three points as follows:

(1) The reactor vessel cannot pass through the space left around the girder for the polar crane.
(2) The polar crane installed in a reactor containment vessel (hereinafter referred to as a "containment vessel") has not a capacity capable of lifting the reactor vessel and an associated radiation shield together.
(3) The reactor vessel including the radiation shield combined therewith cannot be carried out through an equipment carrying-in opening provided in the containment vessel.

DISCLOSURE OF INVENTION

An object of the present invention is to provide a reactor vessel handling method, which is able to carry in and out a reactor vessel of a pressurized water reactor in a short time with high efficiency.

According to one aspect of the present invention, an overhead traveling crane in a reactor containment vessel of a pressurized water reactor is removed, and then a reactor vessel is carried out through an opening provided in a top portion of the reactor containment vessel.

According to another aspect of the present invention, in an area within a reactor containment vessel of a pressurized water reactor where an overhead traveling crane is installed, the overhead traveling crane is operated to move aside for creating a space, through which a reactor vessel is able to pass, and then the reactor vessel is carried out through an opening provided in a top portion of the reactor containment vessel.

According to still another aspect of the present invention, an overhead traveling crane in a reactor containment vessel of a pressurized water reactor is reinforced, a reactor vessel is lifted up to an operating floor by using the reinforced overhead traveling crane, and then the reactor vessel is carried out through an opening provided in a side wall of the reactor containment vessel.

According to still another aspect of the present invention, in a state in which an overhead traveling crane in a reactor containment vessel of a pressurized water reactor is removed, a new reactor vessel is carried in to a predetermined position within the reactor containment vessel through an opening provided in a top portion of the reactor containment vessel.

According to still another aspect of the present invention, in a state in which an overhead traveling crane in a reactor containment vessel of a pressurized water reactor is reinforced, a new reactor vessel is carried in to a predetermined position within the reactor containment vessel through an opening provided in a side wall of the reactor containment vessel.

In a reactor containment vessel, to which any of the above-described methods of the present invention is applied, an opening allowing the reactor vessel to be carried out through the opening is provided in at least one of a top wall and a side wall of the reactor containment vessel.

The present invention set forth above can be applied to carrying-out and -in of a reactor vessel of a PWR when the reactor vessel is to be replaced. The present invention can also be applied to carrying-out of a reactor vessel of a PWR when the reactor vessel is to be decommissioned.

BEST MODE FOR CARRYING OUT THE INVENTION (First Embodiment)

A description is made of a first embodiment in which the present invention is applied to replacement of a reactor vessel in a pressurized water reactor plant (hereinafter abbreviated to a "PWR plant"). In this embodiment, after removing a polar crane within a reactor containment vessel (simply called a containment vessel), a reactor vessel (hereinafter abbreviated to "RV") and core internals are carried out together and replaced with a new set of reactor vessel and core internals.

Figure 2:
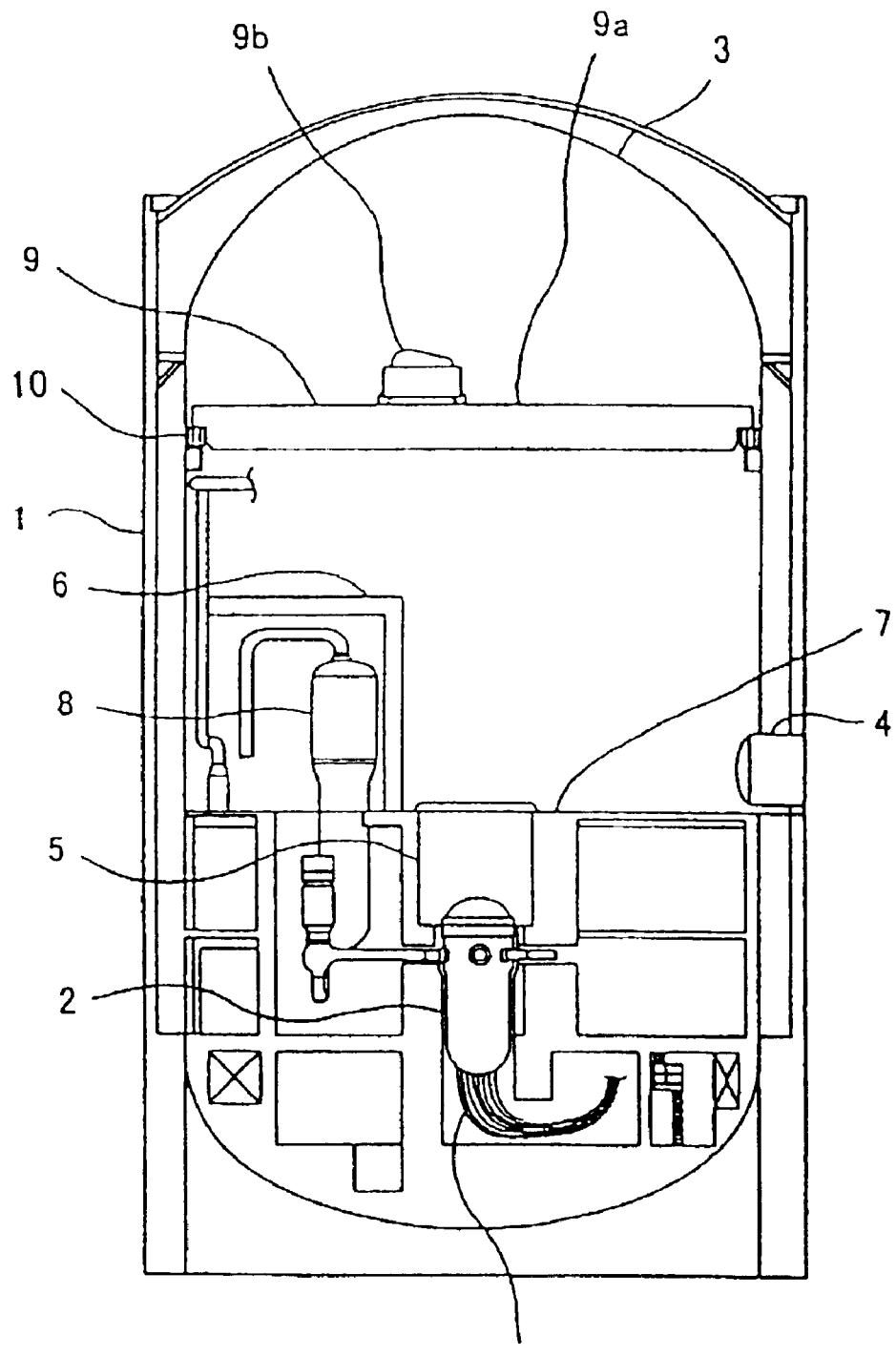
FIG. 2 is a schematic vertical sectional view of a reactor shielding building in a PWR plant to which the present invention is applied.

FIG. 2 is a schematic vertical sectional view of a reactor shielding building in the PWR plant to which the present invention is applied. As shown in FIG. 2, a reactor shielding building 1 is of a reinforced concrete structure, and a steel-made containment vessel (hereinafter abbreviated to "CV") 3 is installed inside the reactor shielding building 1. Walls and floors of a reinforced concrete structure or a steel-framed concrete structure are provided in a lower portion of the CV 3 to define a reactor cavity 5, and the RV 2 is installed at the center of a bottom portion of the reactor cavity 5.

An operation floor 7, on which various kinds of works in the CV 3 are performed, is formed in an upper portion of the reactor cavity 5. An equipment carrying-in opening 4 is provided on the upper side of the operation floor 7 so that various types of equipment may be carried out to the exterior of the reactor shielding building 1 through the opening 4. A steam generator (hereinafter abbreviated to "SG") 8 is arranged in a space surrounded by a shied wall 6. An annular rail 10 is installed just below a dome-shaped ceiling of the CV 3, and a polar crane 9 is mounted on the annular rail 10. The polar crane 9 is an overhead traveling crane comprising a girder 9a and a trolley 9b, and it is used-to move large-weight components in the CV 3.

Figure 3:
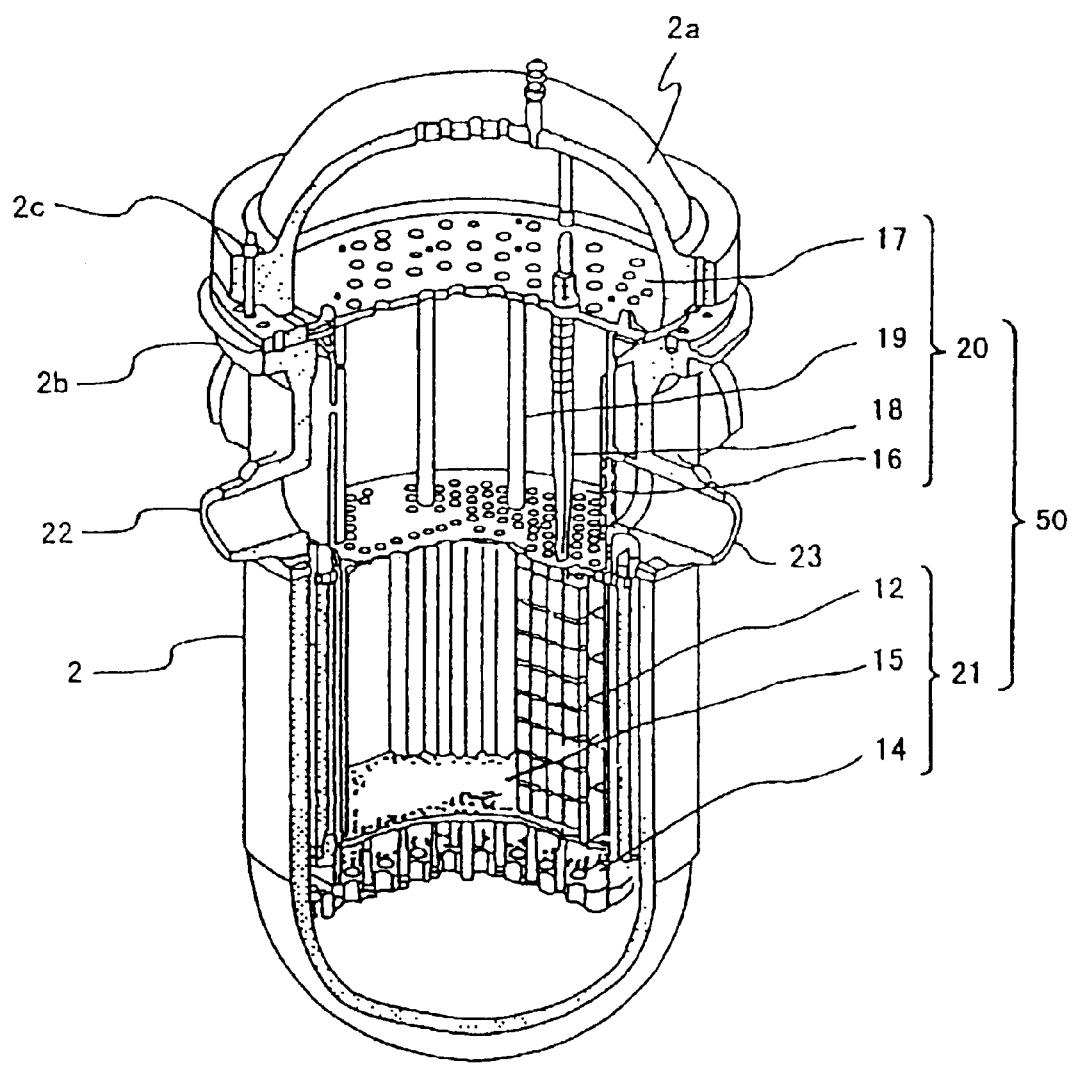
FIG. 3 is a perspective view, partly broken away, of a reactor vessel shown in FIG. 2.

FIG. 3 is a perspective view, partly broken away, of the RV 2 shown in FIG. 2. As shown in FIG. 3, an upper lid 2a is fixed to a body of the RV 2 through a flange 2b using bolts 2c. The RV 2 has a height of about 10 m and a diameter of about 4 m. Core internals 50, described later, are installed inside the RV 2. A core tank 12 is arranged at the center of the RV 2, and a fuel assembly 13 is arranged inside the core tank 12. The core tank 12 is a cylindrical core internal arranged in the RV 2 so as to surround a rector core.

An upper core support plate 17 is detachably provided at an upper end of the core tank 12 and is attached to an upper core plate 16 by a plurality of upper core support posts 19. The upper core plate 16, the upper core support plate 17, a control rod cluster 18, and the upper core support posts 19 constitute upper core internals 20. A lower core support plate 14 and a lower core plate 15 are provided in a lower portion of the core tank 12. The core tank 12, the lower core support plate 14, and the lower core plate 15 constitute lower core internals 21.

The core internals 50 comprise the upper core internals 20 and the lower core internals 21. The core internals 20 and 21 can be separately taken out to the exterior of the RV 2. An inlet nozzle 22 and an outlet nozzle 23 both provided in the RV 2 are connected via pipes to the SG 8 installed in the CV 3.

Figure 1A:
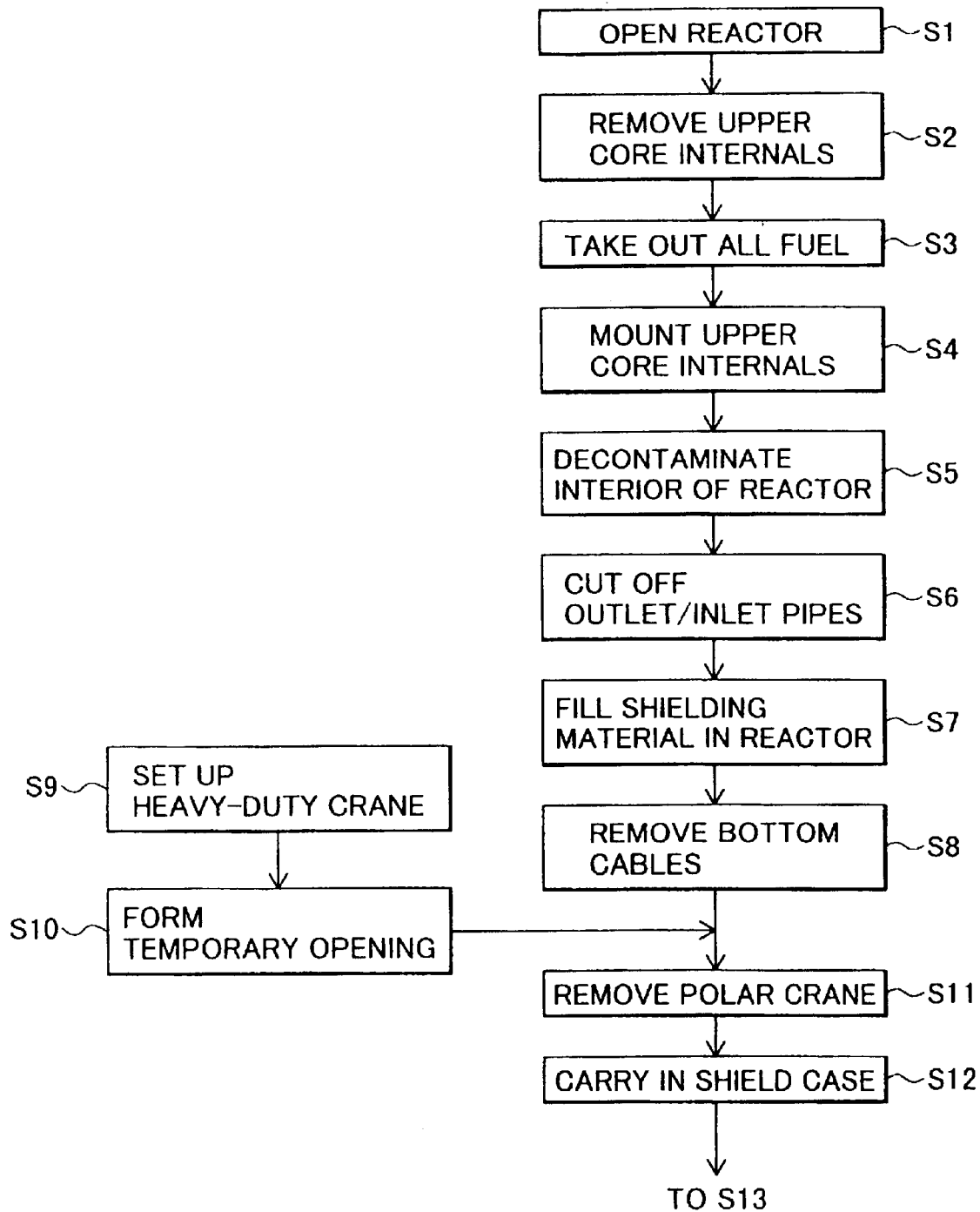
FIG. 1A is a flowchart showing a method for replacing a reactor vessel according to a first embodiment of the present invention.
Figure 1B:
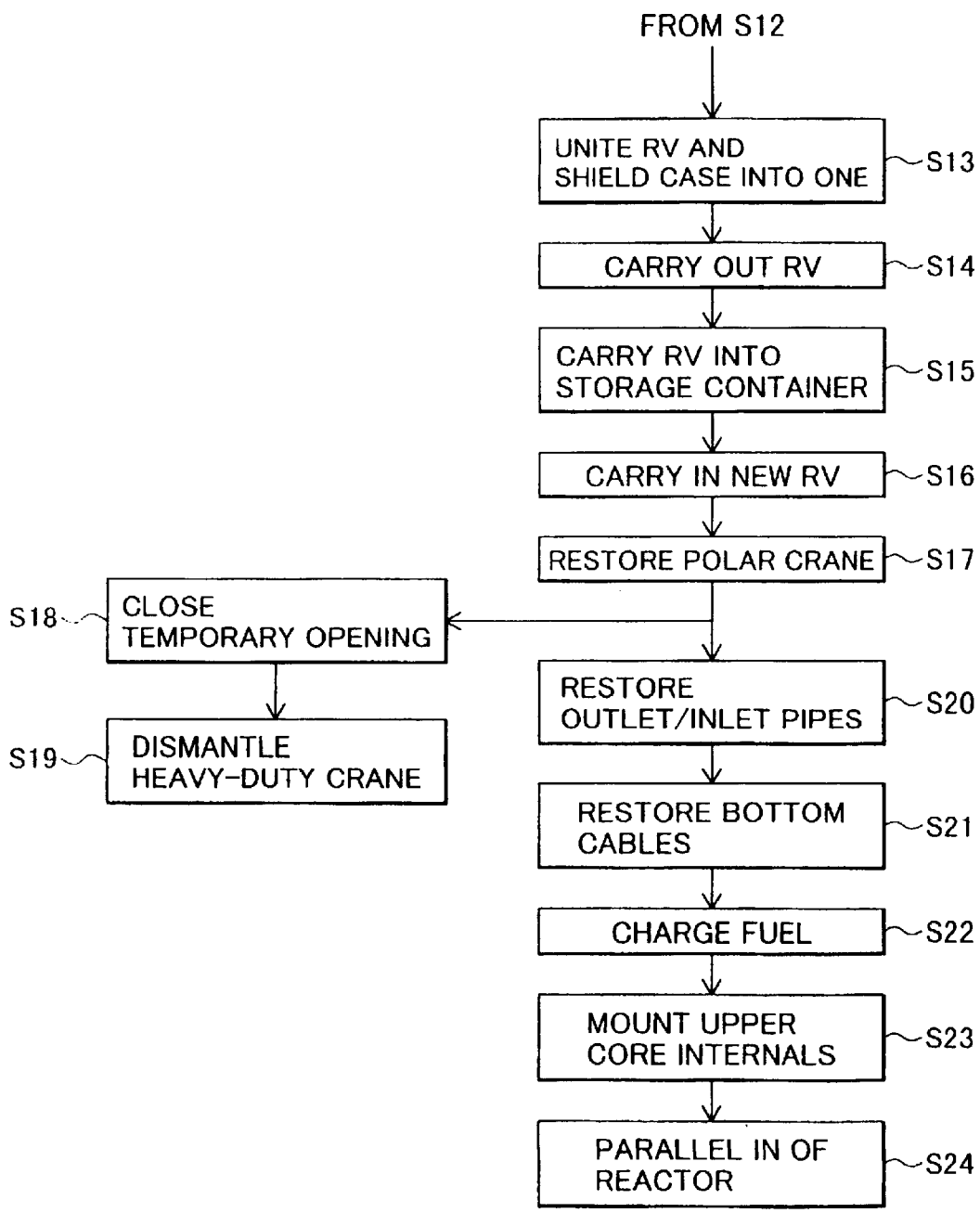
FIG. 1B is a flowchart showing a method for replacing a reactor vessel according to a first embodiment of the present invention.
Figure 4:
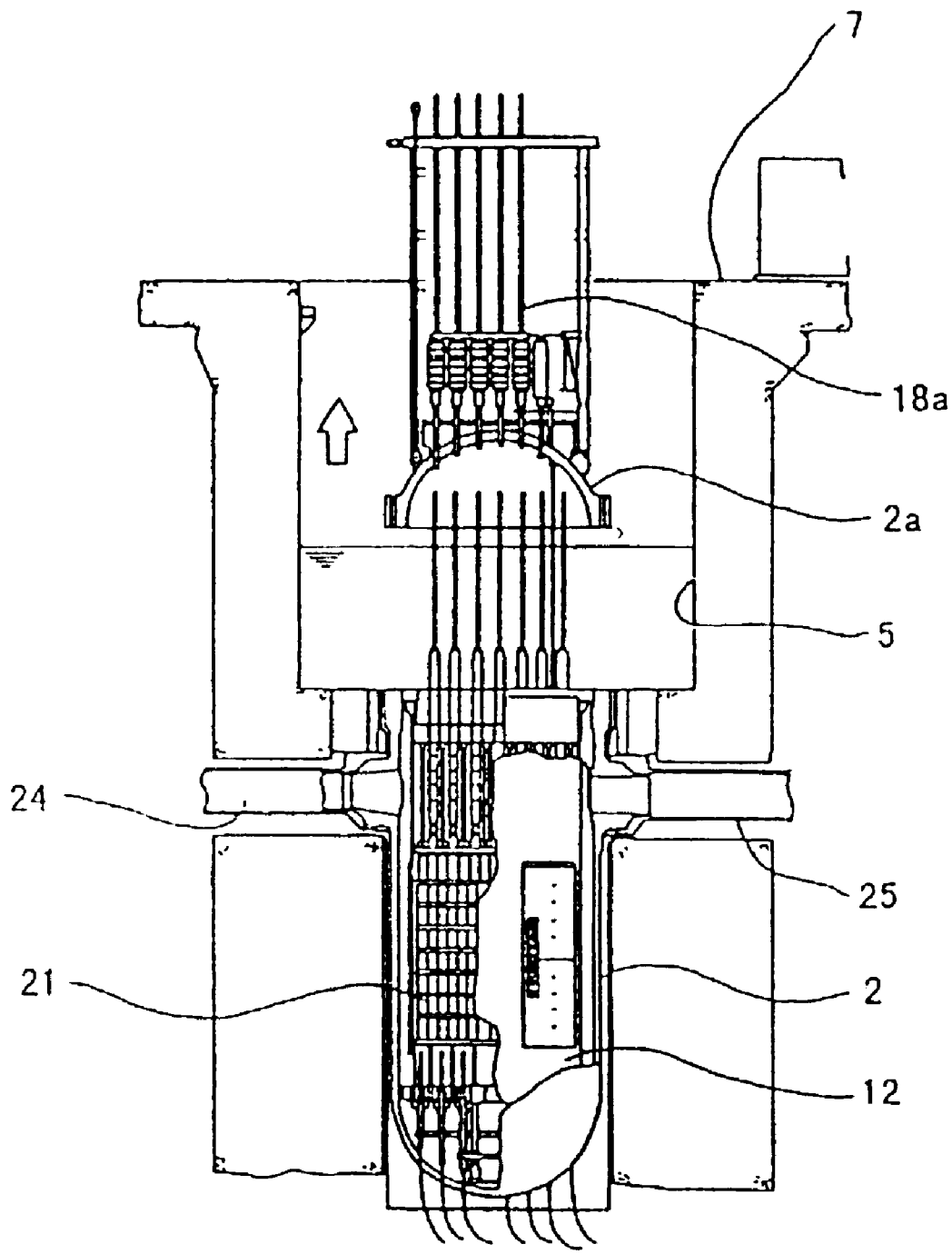
FIG. 4 is a schematic vertical sectional view of a reactor vessel and surroundings thereof during work for making a reactor open.

FIG. 1A and FIG. 1B are flowchart showing a method for replacing the RV according to the first embodiment. First, work for making the reactor open is performed in step S1. In the reactor opening work, the upper lid 2a of the RV 2 is removed. FIG. 4 is a schematic vertical sectional view of the RV 2 and surroundings thereof during the reactor opening work. Numeral 18a denotes a control rod driving mechanism.

Figure 5:
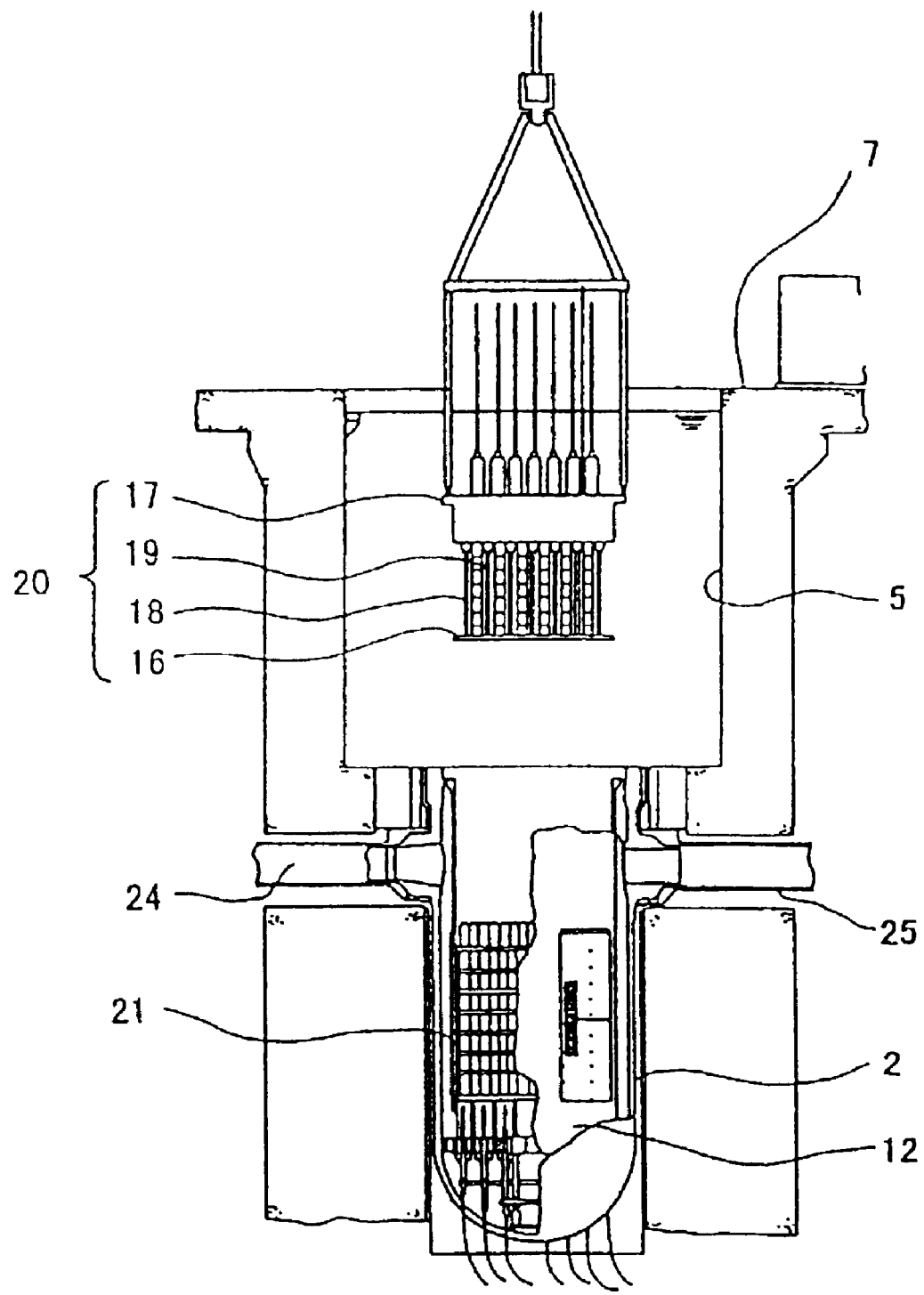
FIG. 5 is a schematic vertical sectional view of the reactor vessel and surroundings thereof during work for removing upper core internals 20.

Then, in step S2, the upper core internals 20 are removed. This work is performed in a state in which a core water level is raised to fully fill the reactor cavity 5 with water. FIG. 5 is a schematic vertical sectional view of the RV 2 and surroundings thereof during the work for removing the upper core internals 20. The upper core plate 16, the upper core support plate 17, the control rod cluster 18, and the upper core support posts 19, which constitute the upper core internals 20, are removed together.

Figure 6:
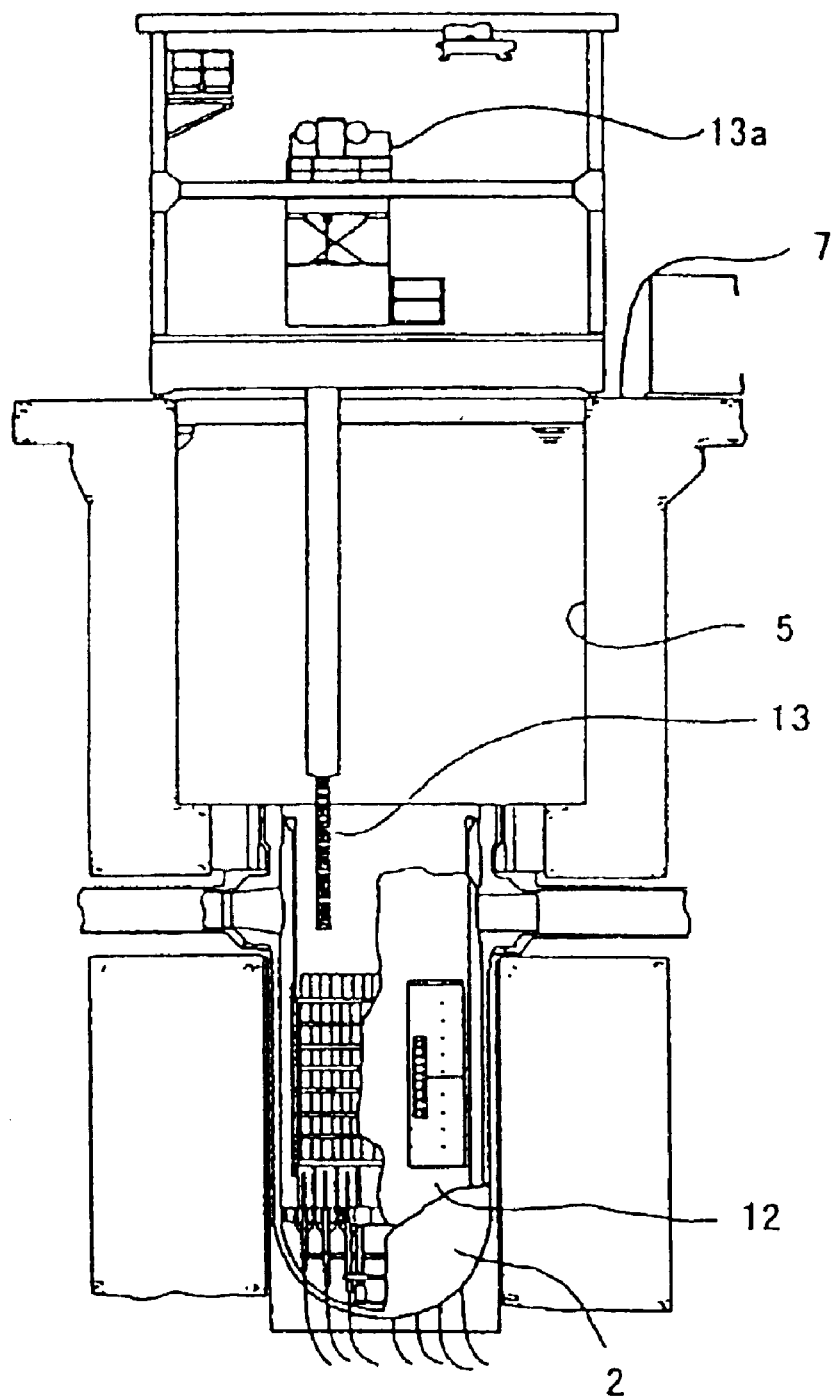
FIG. 6 is a schematic vertical sectional view of the reactor vessel and surroundings thereof during work for taking out a fuel assembly.

Then, in step S3, all fuel is taken out and moved to a fuel pool. This work is performed while the core water level is kept raised to fully fill the reactor cavity 5 with water. FIG. 6 is a schematic vertical sectional view of the RV 2 and surroundings thereof during the work for taking out a fuel assembly 13 with a fuel replacing apparatus 13a.

Then, in step S4, the upper core internals 20 are returned into the RV 2 and mounted in place. When the upper core internals 20 are not replaced, this step can be omitted.

Then, in step S5, the interior of the RV 2 is decontaminated to eliminate radioactive materials deposited on an inner wall of the RV 2 and the core internals 50. Chemical decontamination using chemicals is one example of decontaminating methods. Performing the decontamination makes it possible to simplify a shield that is used when carrying out the RV 2 to the exterior of the reactor shielding building 1. When the decontamination is not performed, this step can be omitted.

Then, in step S6, pipes 24 and 25 connected to the inlet nozzle 22 and the outlet nozzle 23 respectively are cut off. On that occasion, for reducing an exposure rate of workers engaged in the pipe cutting work, water sealing plugs 22a and 23a are attached to the inlet nozzle 22 and the outlet nozzle 23 respectively from the inside of the reactor while the reactor cavity 5 is kept fully filled with water. Subsequently, the reactor water level is lowered to a position of the flange 2b in the upper portion of the RV 2. Thereafter, for shutting off radiations from the inner side of the reactor, a shield lid 26 having a radiation shielding capability is attached to the flange 2b by bolts 26a. Then, after securing a space for the pipe cutting work, structural members, such as sealing materials, located above the nozzles and thermal insulating materials located around the nozzles are removed. With removal of those materials, the RV 2 is prevented from interfering with the nozzles when it is carried out.

Figure 7:
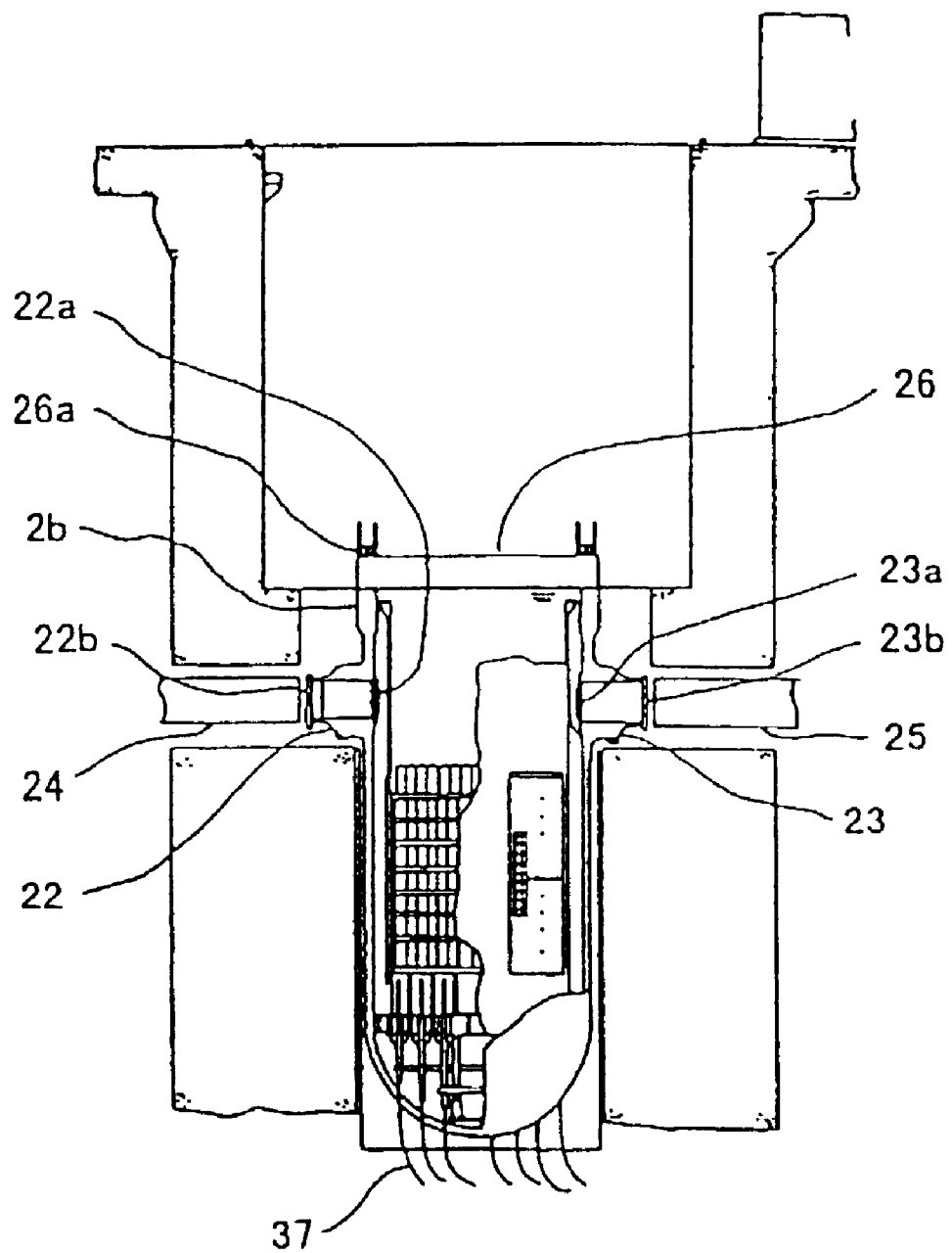
FIG. 7 is a schematic vertical sectional view of the reactor vessel and surroundings thereof, showing a state after cutting pipes connected to an inlet nozzle and an outlet nozzle.

FIG. 7 is a schematic vertical sectional view of the RV 2 and surroundings thereof, showing a state after cutting off the pipes 24 and 25 connected respectively to the inlet nozzle 22 and the outlet nozzle 23. To prevent radioactive materials in the reactor from flowing out to the exterior of the RV 2, closure plates 22b and 23b are attached to the respective nozzles after the pipe cutting work from the outer side of the RV 2.

Then, in step S7, a radiation shielding material, such as mortar, is filled in the reactor. The shielding material is filled through a hose or the like inserted in a hole, which is formed in the shield lid 26 beforehand, Filling the shielding material into a reactor bottom portion makes it possible to omit a bottom plate of a radiation shield 28, described later, for the RV 2. After filling the shielding material, the hole formed in the shield lid 26 is plugged. When the radiation dose from the reactor bottom portion is not more than a transport standard value, this step may be omitted.

Figure 8:
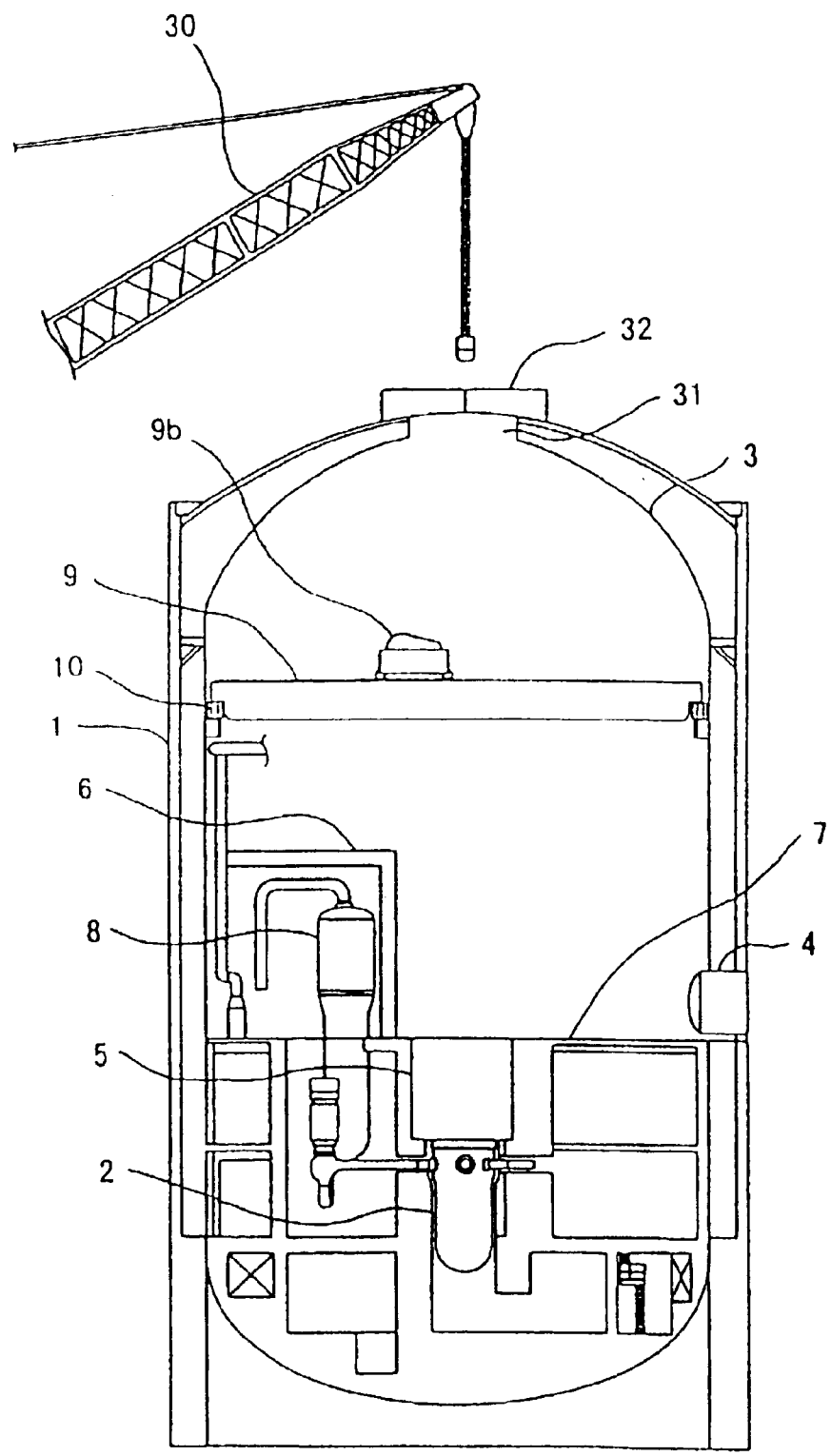
FIG. 8 is a schematic vertical sectional view of the reactor shielding building after setting up a heavy-duty crane and forming a temporary opening.

Then, in step S8, cables 37 connected to the bottom portion of the RV 2 for in-core instrumentation are removed. In step S9, a heavy-duty crane 30 for carrying out (in) the RV 2 is set up outside the reactor shielding building 1. Then, in step S10, a temporary opening 31, through which the RV 2 can be carried out (in), is formed in the ceiling (top wall) of the reactor shielding building 1 and the containment vessel 3. A shutter 32 capable of opening and closing is provided above the temporary opening 31 for protection against rain. FIG. 8 is a schematic vertical sectional view of the reactor shielding building 1 after setting up the heavy-duty crane 30 and forming the temporary opening 31.

Figure 9:
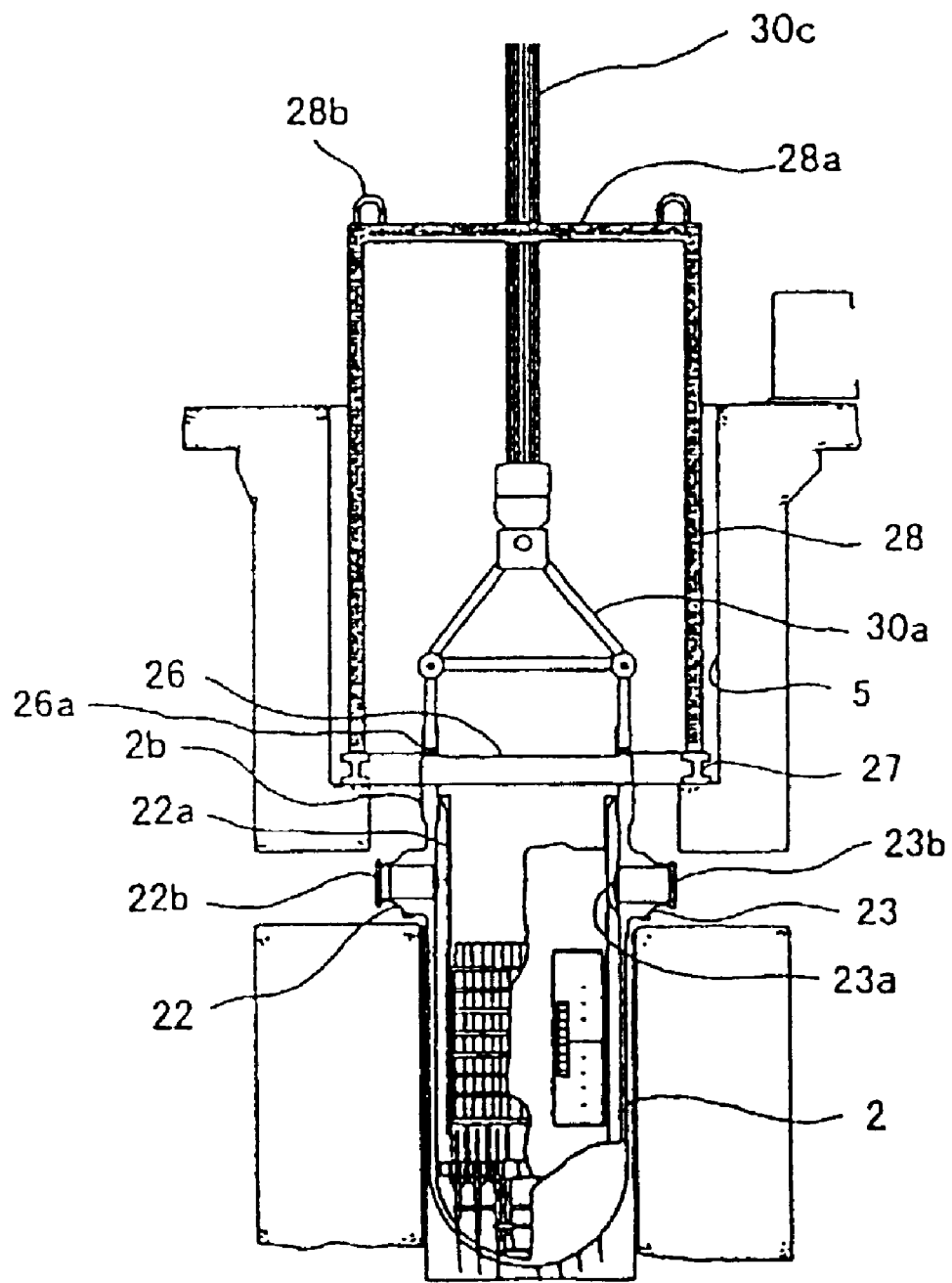
FIG. 9 is a schematic vertical sectional view of the reactor vessel and surroundings thereof after temporarily placing a shield in a reactor cavity.

Then, in step S11, the polar crane 9 is removed and, in step S12, the radiation shield 28 is carried in. When carrying in the radiation shield 28, reinforcing members 27 are first placed at the bottom of the reactor cavity 5 so as to surround the RV 2. The reinforcing members 27 serve to distribute the weight of the radiation shield 28 over the bottom of the reactor cavity 5. Subsequently, the shutter 32 is opened, and the radiation shield 28 is carried into the CV 3 through the temporary opening 31 and temporarily placed on the reinforcing members 27 by using the heavy-duty crane 30. To that end, the temporary opening 31 is set to a size allowing the radiation shield 28 to be carried in (out) through it. The radiation shield 28 has a cylindrical shape and is provided at its upper end with a shield upper lid 28a in the form of a disk. The radiation shield 28 serves to shut off radiations from the RV 2. FIG. 9 is a schematic vertical sectional view of the RV 2 and surroundings thereof, showing a state in which the radiation shield 28 is temporarily placed in the reactor cavity 5 and a sling 30a is attached to the shield lid 26.

Then, in step S13, the RV 2 is lifted up and united with the radiation shield 28. The strongback (sling) 30a as a jig for lifting up the RV 2 is attached to the shield lid 26 using eight to ten pieces of bolts 26a. The sling 30a is suspended by the heavy-duty crane 30. The shield upper lid 28a has a slit-like opening through which the sling 30a is able to pass, and has hooks 28b provided on its upper side for hanging the radiation shield 28. By raising the sling 30a with the heavy-duty crane 30, the RV 2 is lifted up. The RV 2 is combined with the radiation shield 28 just by lifting up the RV 2 such that the shield lid 26 is brought into abutment with the shield upper lid 28a.

Figure 10:
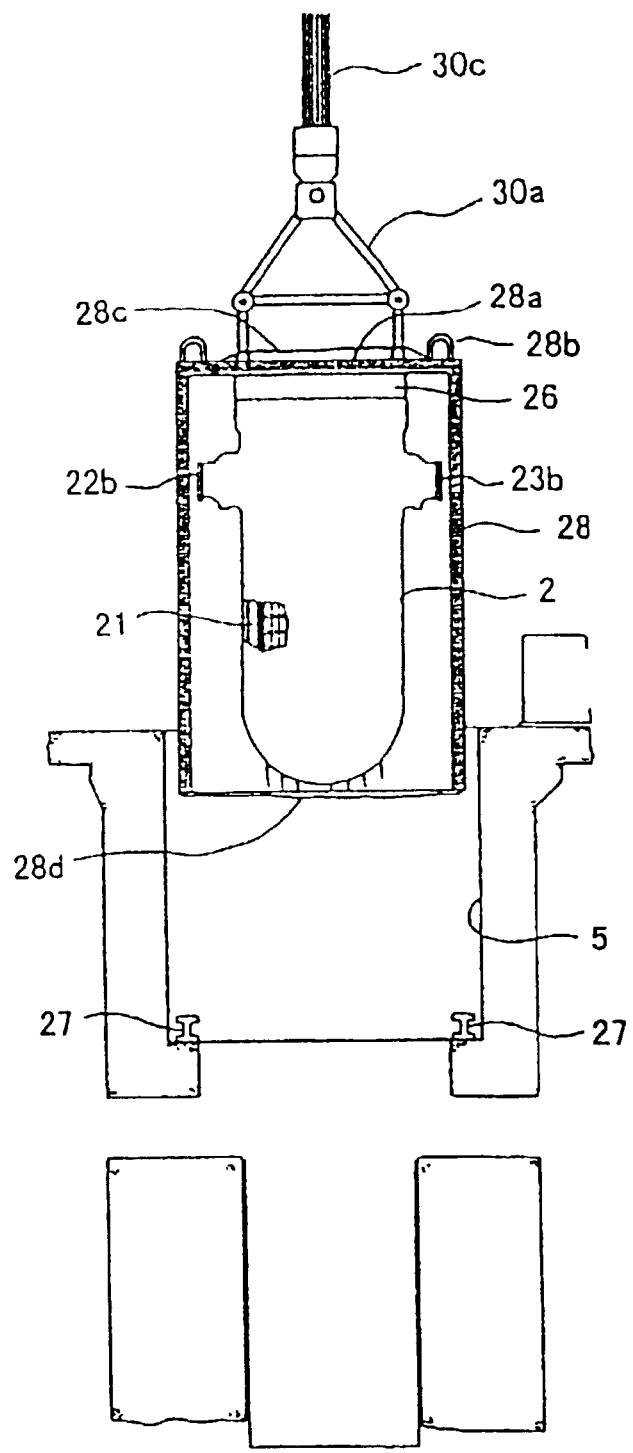
FIG. 10 is a schematic vertical sectional view of the reactor vessel and surroundings thereof, showing a state in which the reactor vessel and the shield are united into one.

Subsequently, the opening of the shield upper lid 28a is covered with a protective sheet 28c, and ends of the protective sheet 28c are fixedly attached in a sealed-off manner using a sealing tape. Likewise, a lower end of the radiation shield 28 is covered with a protective sheet 28d whose ends are also fixedly attached in a sealed-off manner using a sealing tape. Each of the protective sheets 28c and 28d can be formed of, e.g., a polyvinyl chloride sheet. FIG. 10 is a schematic vertical sectional view of the RV 2 and surroundings thereof, showing a state in which the RV 2 is lifted up and united with the radiation shield 28.

Thus, the radiation shield 28 can be easily combined with the RV 2 in a surrounding relation in a short time just by lifting up the core internals 50 together (in union) with the RV 2. Also, since the openings of the radiation shield 28 are sealed off with the protective sheets 28c and 28d, radioactive dust deposited on the surface of the RV 2 can be prevented from scattering to the exterior.

Figure 11:
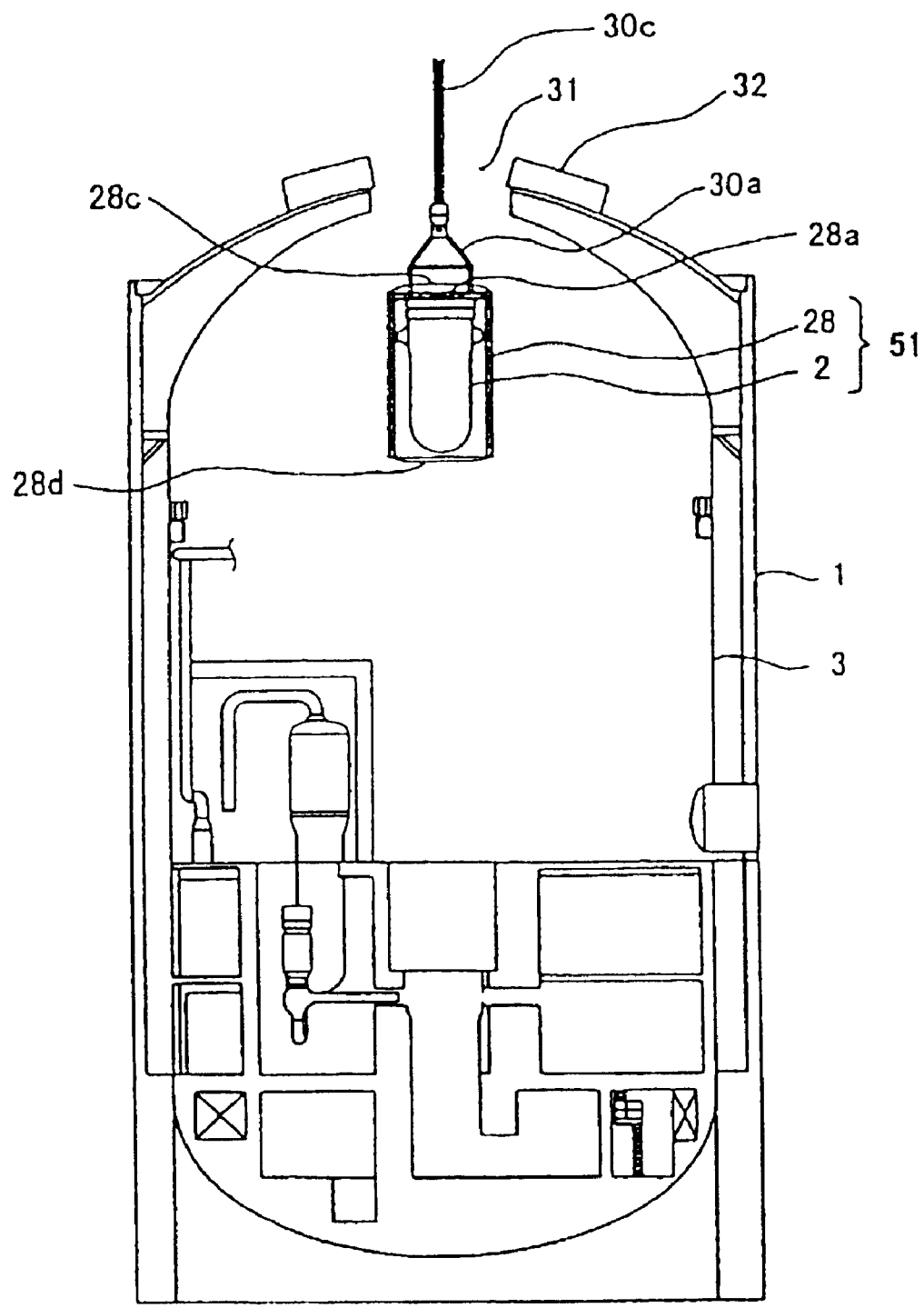
FIG. 11 is a schematic vertical sectional view of a containment vessel, showing a state immediately before carrying out a large-size block, which comprises the reactor vessel and the shield having been united into one, through the temporary opening.

Next, in the state of the radiation shield 28 being combined with the RV 2, the surfaces of the shield and the protective sheets are decontaminated. The fact that the surface dose rate has been lowered to such a level as not affecting an external environment of the containment vessel is confirmed by a contamination test. FIG. 11 is a schematic vertical sectional view of the CV 3, showing a state immediately before lifting up a large-size block 51, which includes the radiation shield 28 and the RV 2 united into one, by the heavy-duty crane 30 and carrying out the large-size block 51 through the temporary opening 31.

As shown in FIG. 11, the radiation shield 28 covers the whole of the RV 2 from the top to the bottom thereof. Since the bottom portion of the RV 2 generates a lower radiation dose than a core portion located above the bottom portion of the RV 2 and is filled with the radiation shielding material, it is not required to attach a radiation shield to the bottom portion of the RV 2 in most cases.

Figure 12A:
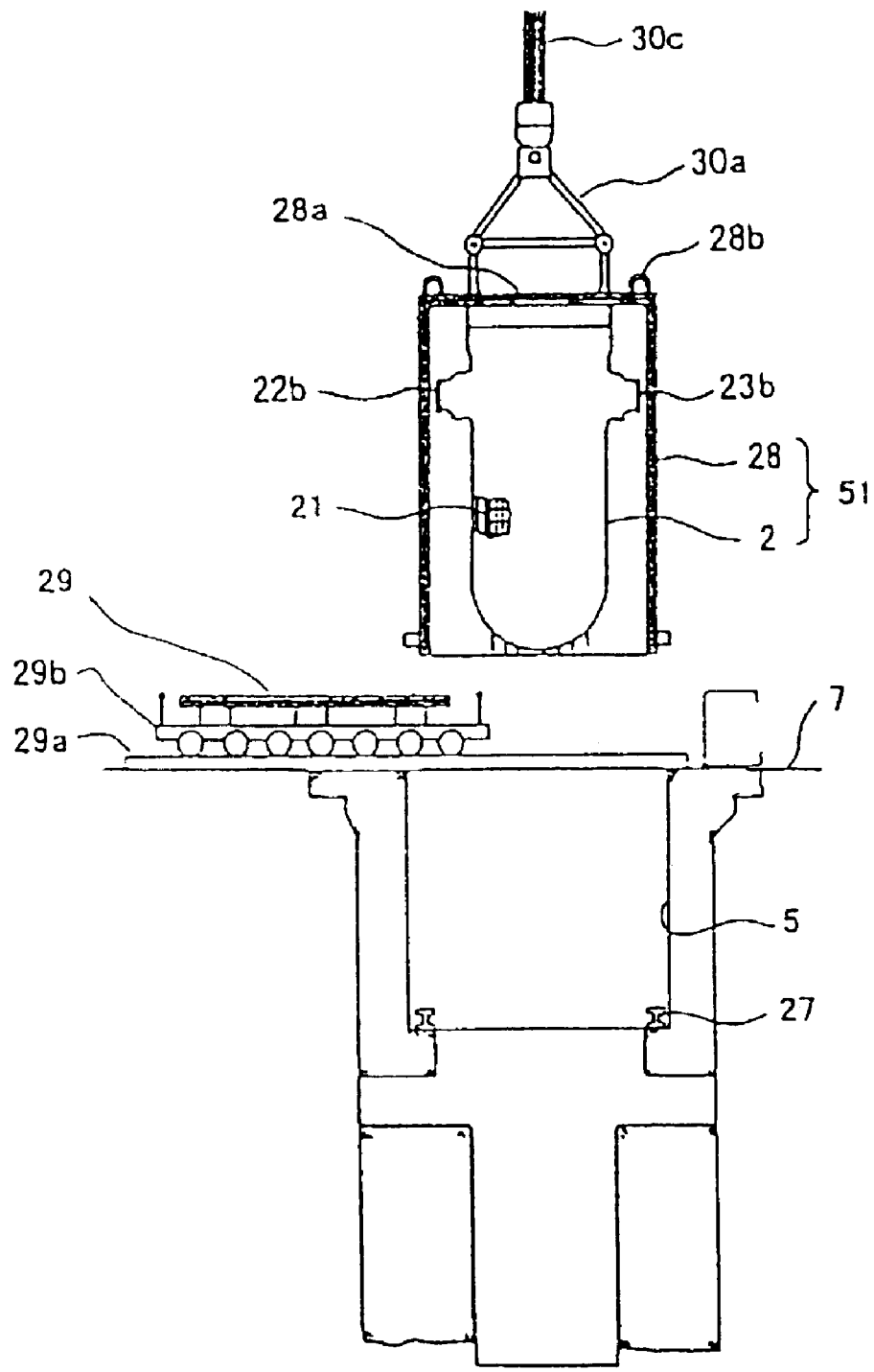
FIG. 12A is a view showing a state before attaching a bottom shield.
Figure 12B:
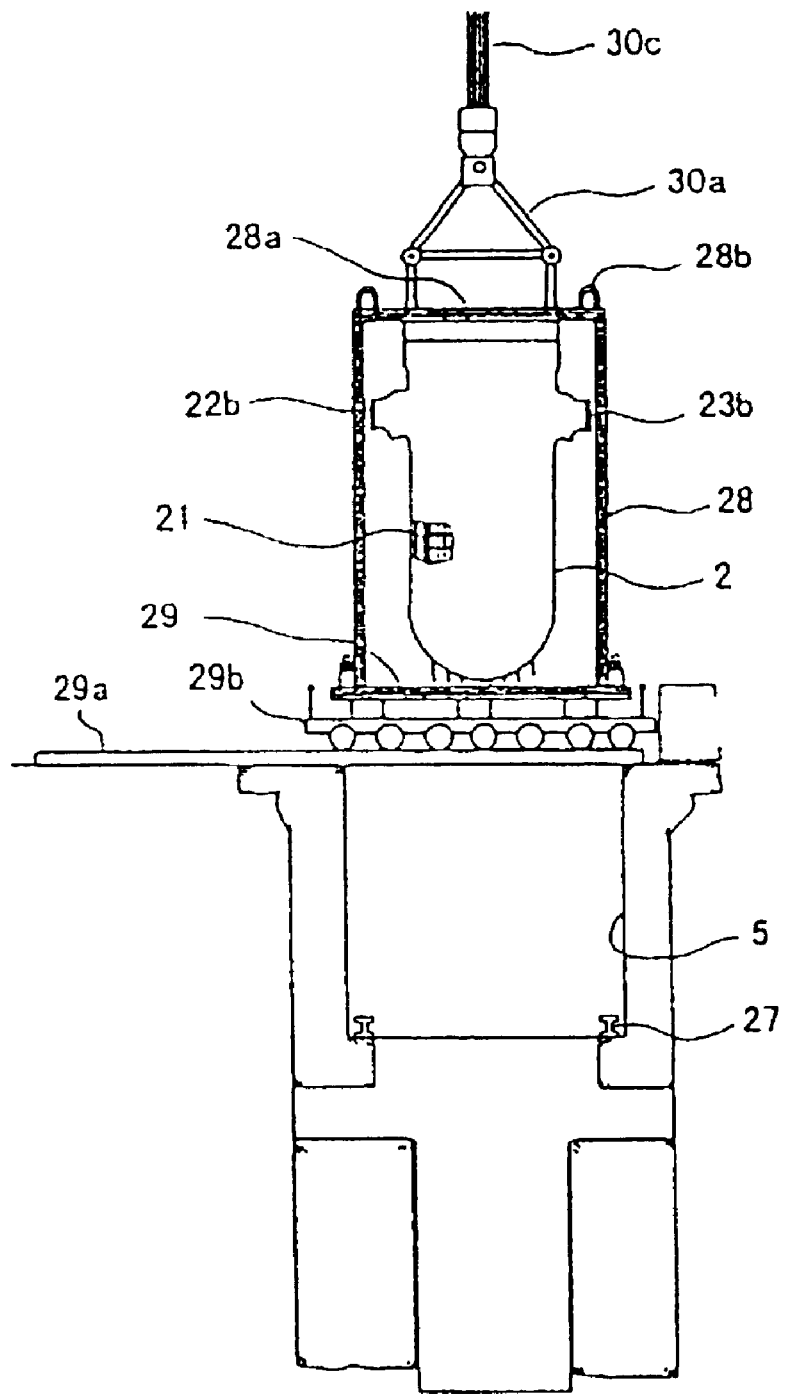
FIG. 12B is a view showing a state after attaching the bottom shield.

When it is required to attach such a shield to the bottom portion of the RV 2, the shield is attached to the reactor bottom portion in step S13. A method for attaching the shield is now described with reference to FIGS. 12A and 12B. FIG. 12A shows a state before attaching a bottom shield 29, and FIG. 12B shows a state after attaching the bottom shield 29.

As shown in FIG. 12A, the large-size block 51 is lifted up by the heavy-duty crane 30 to a level above the operation floor 7, rails 29a are set at the top of the reactor cavity 5, and a flatcar 29b including the bottom shield 29 laid thereon is rested on the rails 29a. Then, as shown in FIG. 12B, the flatcar 29b including the bottom shield 29 laid thereon is moved to a position right below the large-size block 51, and the large-size block 51 is descended to a height at which it contacts the bottom shield 29. Thereafter, the large-size block 51 and the bottom shield 29 are joined to each other by, e.g., bolts.

In such a way, when carrying the RV 2 out of the reactor shielding building 1, the surface dose rate of the radiation shield 28 can be reduced to a level lower than a reference value (limit value).

Figure 13:
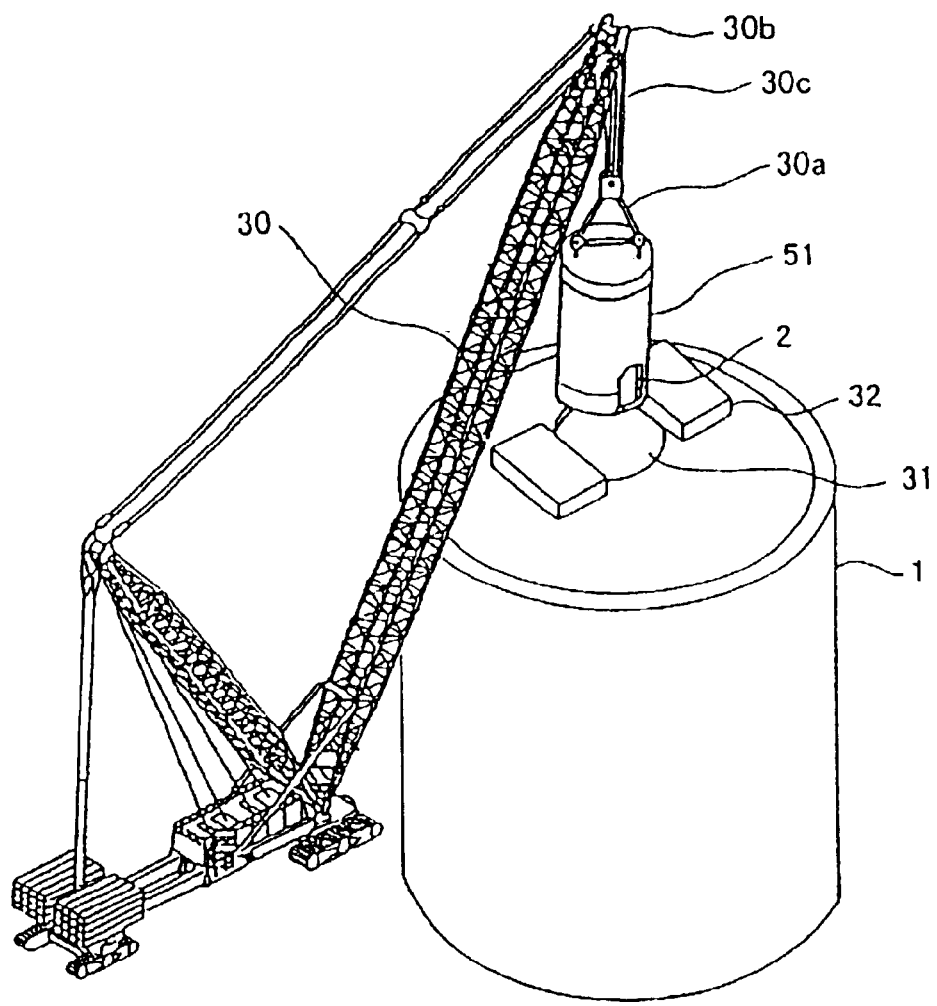
FIG. 13 is a view showing a state in which the large-size block is carried out through the temporary opening of the reactor shielding building.
Figure 13:
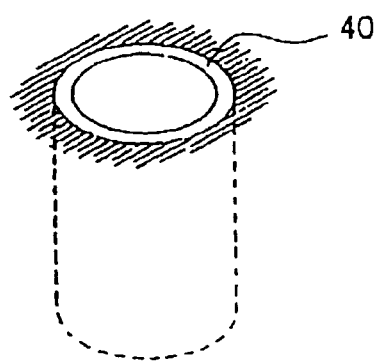

Then, in step S14, the RV 2 is carried out. More specifically, the RV 2 is lifted up as the large-size block 51 in union with the radiation shield 28 and the core internals 50. The large-size block 51 is carried out to the exterior through the temporary opening 31 of the reactor shielding building 1. After carrying out the large-size block 51 to the exterior of the reactor shielding building 1, the shutter 32 is closed. FIG. 13 is a view showing a state in which the large-size block 51 is carried out by the heavy-duty crane 30 through the temporary opening 31 of the reactor shielding building 1.

Then, in step S15, the large-size block 51 carried out of the reactor shielding building 1 is carried into a storage container 40. On that occasion, a fore end 30b of the heavy-duty crane 30 is moved from a position right above the temporary opening 31 of the reactor shielding building 1 to a position right above the storage container 40 while keeping the large-size block 51 hanged by the heavy-duty crane 30. Thereafter, the large-size block 51 is descended and carried into the storage container 40.

Figure 14:
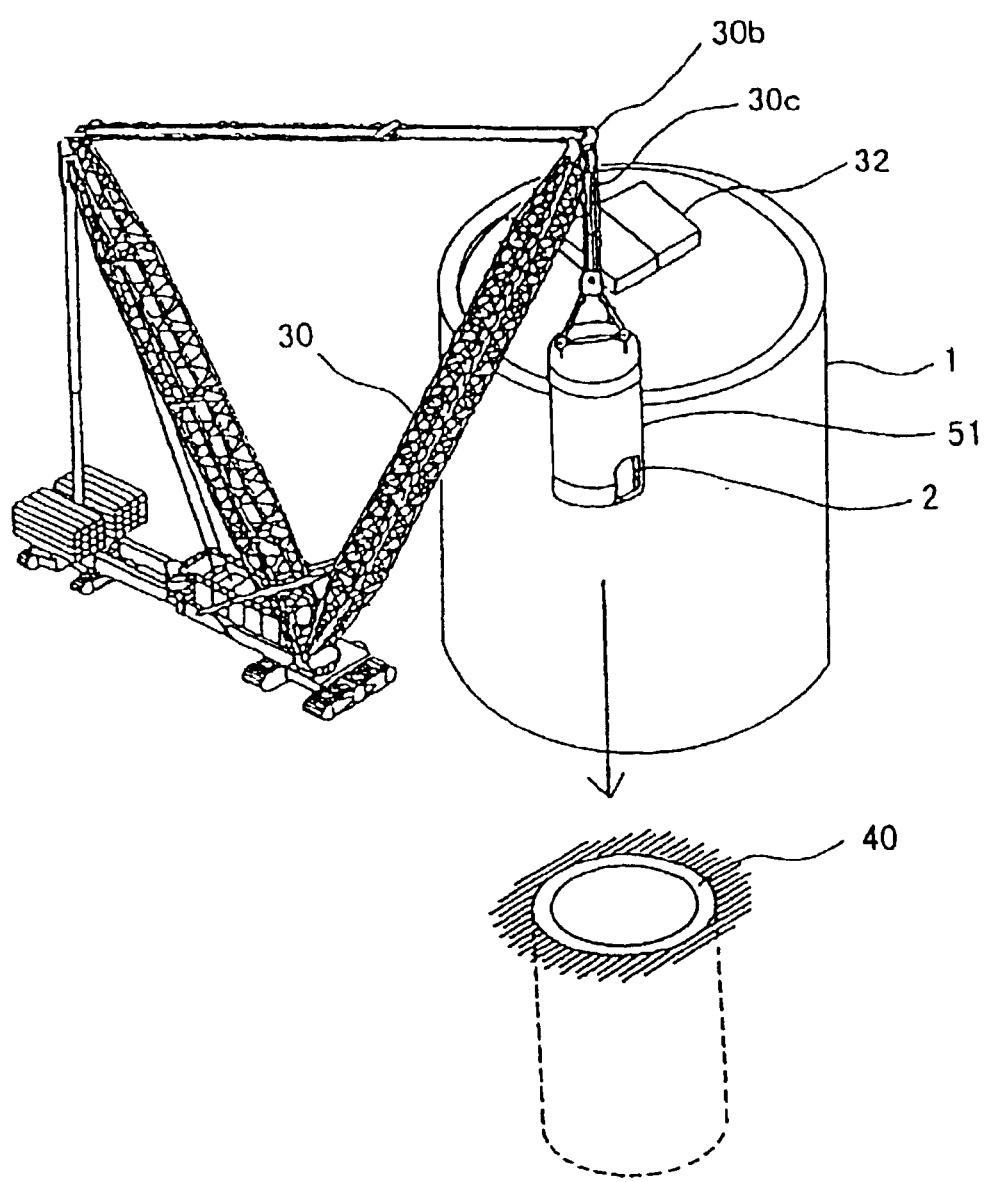
FIG. 14 is a view showing a state immediately before carrying the large-size block into a storage container.

FIG. 14 is a view showing a state immediately before carrying the large-size block 51 into the storage container 40 in step S15. The storage container 40 is provided under the ground near the reactor shielding building 1, and has a structure capable of containing the large-size block 51 in an upright posture. Thus, the large-size block 51 can be carried into the storage container 40 by using the heavy-duty crane 30 while the large-size block 51 is kept in the same state as that just after being carried out of the reactor shielding building 1. After carrying the large-size block 51 into the storage container 40, a lid is attached to the storage container 40 for bringing it into a sealed-off condition.

As an alternative, in step S15, the large-size block may be loaded on a trailer, transported to the storage container, and then carried into it. This method is effective when the storage container is remote from the reactor shielding building. Also, the storage container may be provided in a building of a ridge continuation with the reactor shielding building. The storage container may be provided on the ground to be able to contain the large-size block in a horizontally laid state.

A method for loading the large-size block on a trailer (flatcar) in a horizontally laid state is now described. The large-size block 51 hanged by the heavy-duty crane 30 is moved to a tilting-down apparatus provided on a trailer 34, which is stopped near the reactor shielding building 1. Then, the large-size block 51 is horizontally laid by the tilting-down apparatus to be loaded on the trailer 34.

Figure 15A:
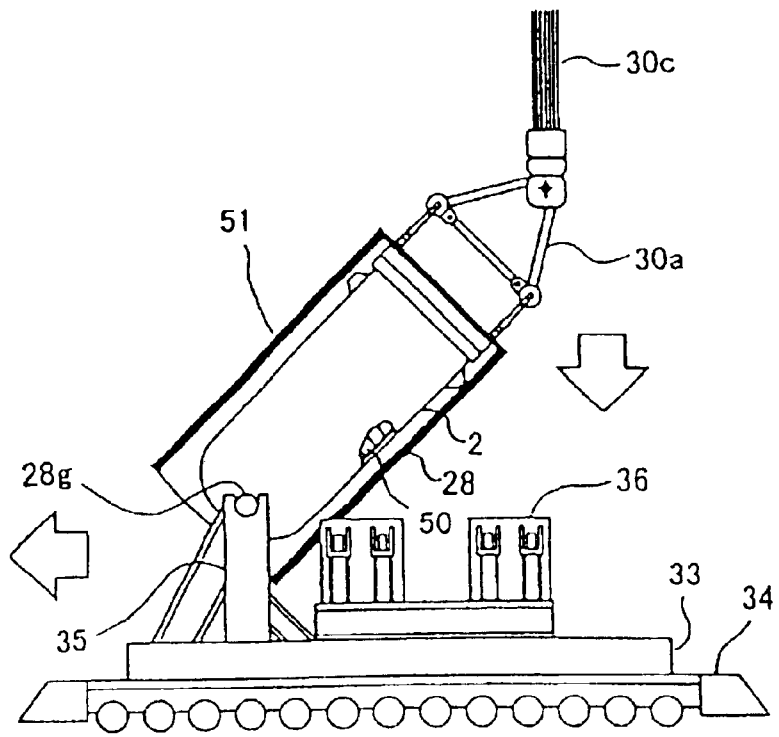
FIG. 15A is a view showing a state in which the large-size block is tilted down to be laid on a trailer.
Figure 15B:
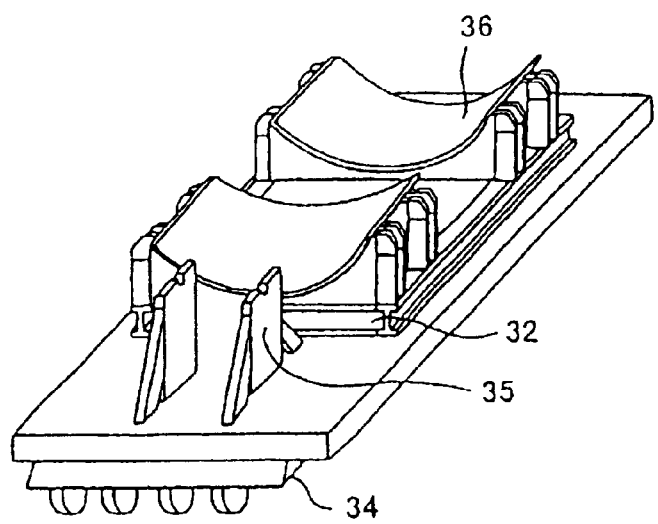
FIG. 15B is a view showing one example of a tilting-down apparatus provided on the trailer for tilting down the large-size block.

FIG. 15A is a view showing a state in which the large-size block 51 is tilted down to be laid on the trailer 34, and FIG. 15B is a view showing one example of the tilting-down apparatus provided on the trailer for tilting down the large-size block. In such a case, a tilting-down shaft 28g is attached to the radiation shield 28 beforehand.

The large-size block 51 is slowly descended toward a tilting-down bearing 35 while being vertically hanged by heavy-duty crane wires 30c, and at the same the trailer 34 is slowly moved in a direction corresponding to the direction in which the large-size block 51 is to be tilted down. As a result, the radiation shield 28 is rotated about the tilting-down shaft 28g, and the large-size block 51 is gradually tilted down from the vertically hanged state. On that occasion, the distance and speed by and at which the trailer 34 is moved and the distance and speed by and at which the large-size block 51 is descended, are adjusted in a proper combination so that the weight imposed on the tilting-down shaft 28g is reduced to, e.g., about a half the total weight of the large-size block.

In such a way, the large-size block 51 is gradually horizontally laid on a platform 36 of the trailer 34 while avoiding excessive loads from being imposed on the tilting-down shaft 28g and the tilting-down bearing 35. After horizontally laying the large-size block 51 on the platform 36 of the trailer 34, the large-size block 51 is fixed in place by, e.g., wires. The work for tilting down the large-size block is thus completed.

Through the procedures described above, the work for carrying out, as the large-size block 51, the RV 2 in union with the radiation shield 28 and the core internals 50 is completed.

Then, in step S16, a new reactor vessel (new RV) 2 is lifted up by the heavy-duty crane 30 and is carried in to a predetermined position within the containment vessel 3 (i.e., the bottom portion of the reactor cavity 5) through the temporary opening 31. At this time, the new RV 2 is carried in together with the lower core internals 21 mounted in the new RV 2. Alternatively, the new RV 2 and the lower core internals 21 may be carried in separately.

Then, in step S17, the removed polar crane 9 is carried into the containment vessel 3 through the temporary opening 31 for restoration to the same state as that before removal. Subsequently, the temporary opening 31 is closed in step S18, and the heavy-duty crane 30 is dismantled in step S19. Further, in step S20, an outlet pipe and an inlet pipe to be connected to the new RV 2 are connected respectively to the outlet nozzle and the inlet nozzle for restoration to the same state as that before replacement. In step S21, the cables are attached to a bottom portion of the new RV 2 for restoration to the same state as that before replacement.

Then, fuel is charged in step S22 and the upper core internals 20 are mounted in step S23 for restoration to the same state as that before removal. Thereafter, in step S24, the operation of the reactor is started. A series of work steps for replacing the reactor vessel is completed through the procedures described above.

Another example of the radiation shield 28 to be combined with the RV 2 will be described below with reference to FIGS. 16A and 16B. A radiation shield 28 of this example differs from that shown in FIG. 9 in having, instead of the shield upper lid 28a, stopper beams 28e that are brought into abutment with the upper lid of the RV 2. The remaining structure is the same as that shown in FIG. 9, and hence a description thereof is omitted here.

Figure 16A:
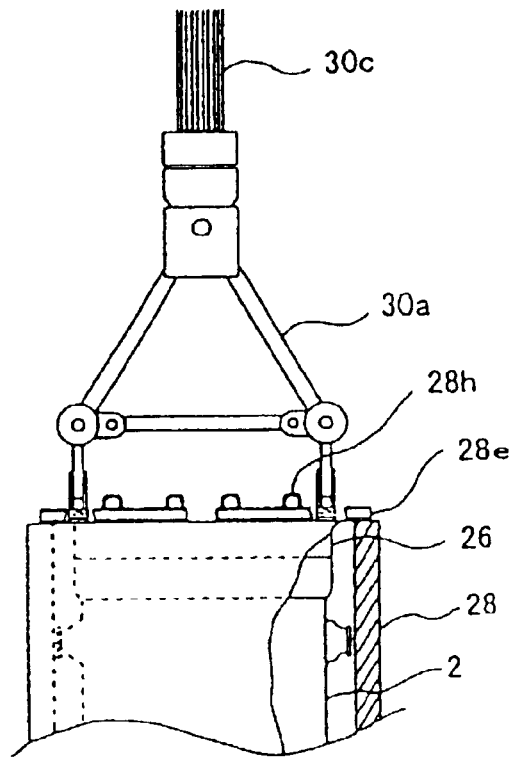
FIG. 16A is a side view, partly broken away, showing details of an attachment unit for a shield as another example.
Figure 16B:
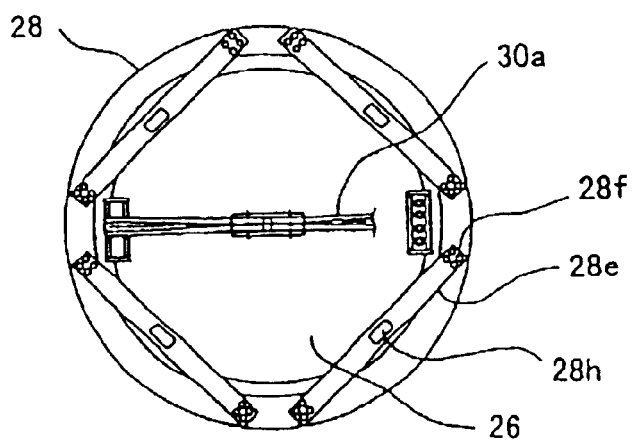
FIG. 16B is a top plan view of FIG. 16A.

FIG. 16A and FIG. 16B show a state in which the RV 2 is lifted up and combined with the radiation shield 28 of this example. Specifically, FIG. 16A is a side view, partly broken away, showing details of an attachment unit for the radiation shield 28, and FIG. 16B is a top plan view of FIG. 16A. As shown in FIG. 16B, opposite ends of each of four stopper beams 28e are fixed to an upper surface of the radiation shield 28 by set bolts 28f. The stopper beams 28e are arranged at positions almost evenly spaced from each other in the circumferential direction such that the stopper beams will not interfere with the sling 30a. A hook 28h for hanging the radiation shield 28 is provided at the center of each stopper beam 28e.

In the radiation shield 28 of this example, since central portions of the stopper beams 28e are brought into abutment with the shield lid 26, the radiation shield 28 can be easily combined with the RV 2 just by lifting up the RV 2. Depending on cases, the height of the radiation shield 28 can be reduced to a height enough to cover nearly a level of-the outlet nozzle (or the inlet nozzle) by filling a shielding material in the RV 2. In such a case, the height of the radiation shield 28 may be reduced to such an extent that the stopper beams 28e are brought into abutment with the outlet nozzle (or the inlet nozzle). In that case, the radiation shield 28 can also be easily combined with the RV 2 in a short time just by lifting up the RV 2.

With the embodiment described above, the reactor vessel can be carried out and in with high efficiency in a short time in a state where the polar crane is removed. It is therefore possible to shorten the term of work for replacing the reactor vessel and hence to shorten the downtime of the nuclear power plant.

Further, when carrying out the reactor vessel, the surface dose rate of the shield for the reactor vessel can be reduced to a level lower than the limit value. Moreover, since workers are less required to access the reactor vessel when the shield is combined with the reactor vessel, the radiation exposure rate of the workers can be reduced during the work for carrying out the reactor vessel.

Additionally, in the embodiment described above, work for draining reactor water in the RV 2 after the end of step S6 may be omitted. In that case, the remaining reactor water is effective to shut off radiations from the core internals 50. It is therefore possible to further reduce the surface dose rate of the RV 2, and hence to omit the step S7 of filling mortar (shielding material). Also, instead of mortar, powder (or fine particles) of, e.g., lead or steel may be sealed off in the reactor.

While, in the embodiment described above, the polar crane is removed in step S11, this step is not limited to removal of the polar crane. For example, the polar crane may be operated to move aside for creating a space, through which the reactor vessel and the shield are able to pass, in an area within the reactor containment vessel where the polar crane is installed. In that case, the polar crane is restored to the original state in step S17.

(Embodiment 2)

Next, a description is made of a second embodiment in which the present invention is applied to replacement of a reactor vessel in a PWR plant. In this embodiment, after reinforcing a polar crane, a large-size block including a reactor vessel (RV) is lifted up by the reinforced polar crane and then carried out through an opening formed so as to penetrate side walls of a containment vessel (CV) and a reactor shielding building for replacement with a new reactor vessel.

Figure 17A:
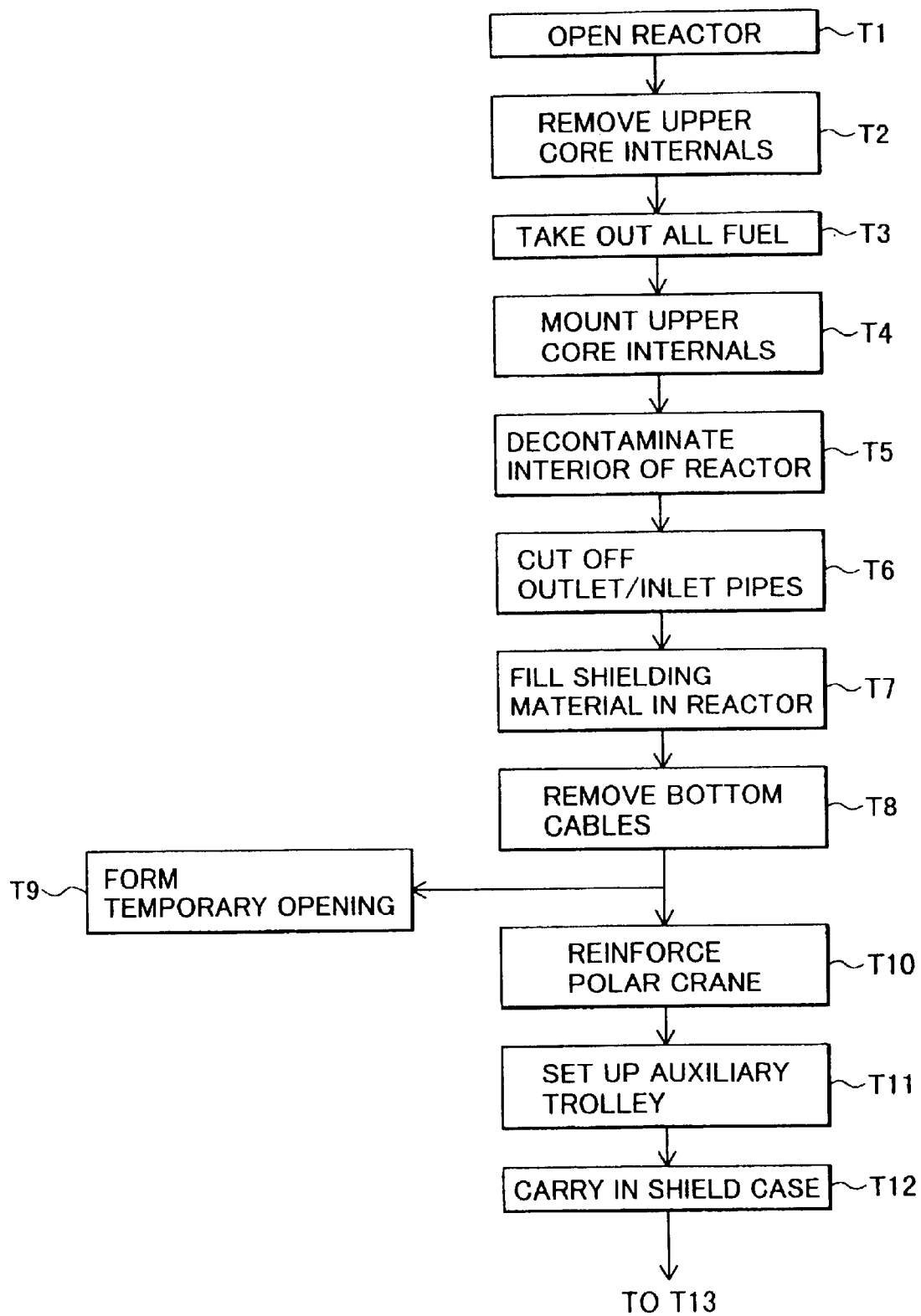
FIG. 17A is a flowchart showing a method for replacing a reactor vessel according to a second embodiment of the present invention.
Figure 17B:
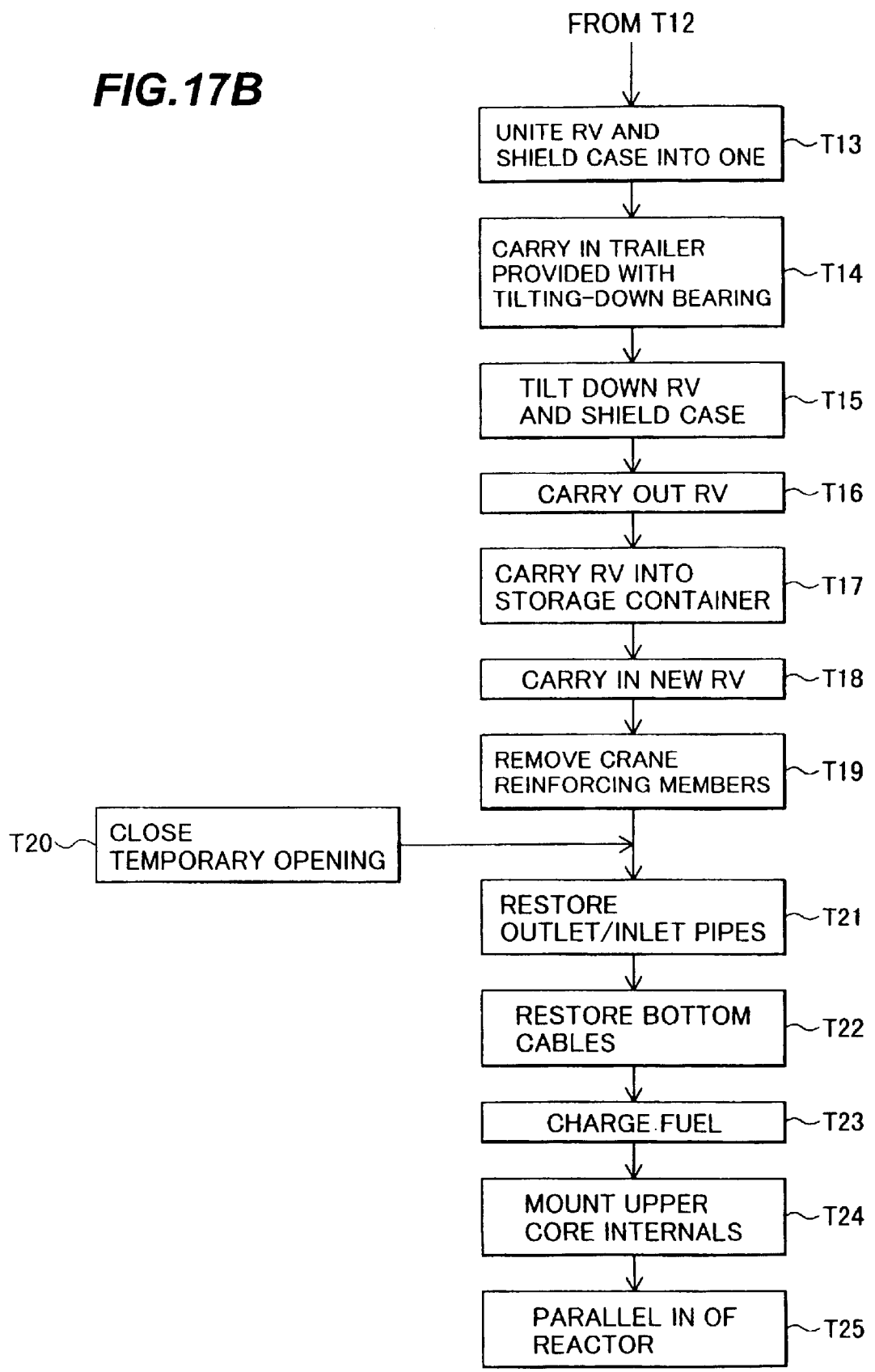
FIG. 17B is a flowchart showing a method for replacing a reactor vessel according to a second embodiment of the present invention.

FIG. 17A and FIG. 17B are flowchart showing a method for replacing the RV according to the second embodiment. Steps T1–T8 and T21–T25 in FIGS. 17A and 17B are the same as steps S1–S8 and S20–S24 in FIGS. 1A and 1B. This second embodiment differs from the first embodiment in steps T9–T20 in FIGS. 17A and 17B. Other procedures are the same as those in the first embodiment and a description thereof is omitted here. Steps T9–T20 in this embodiment will be described below.

Figure 18:
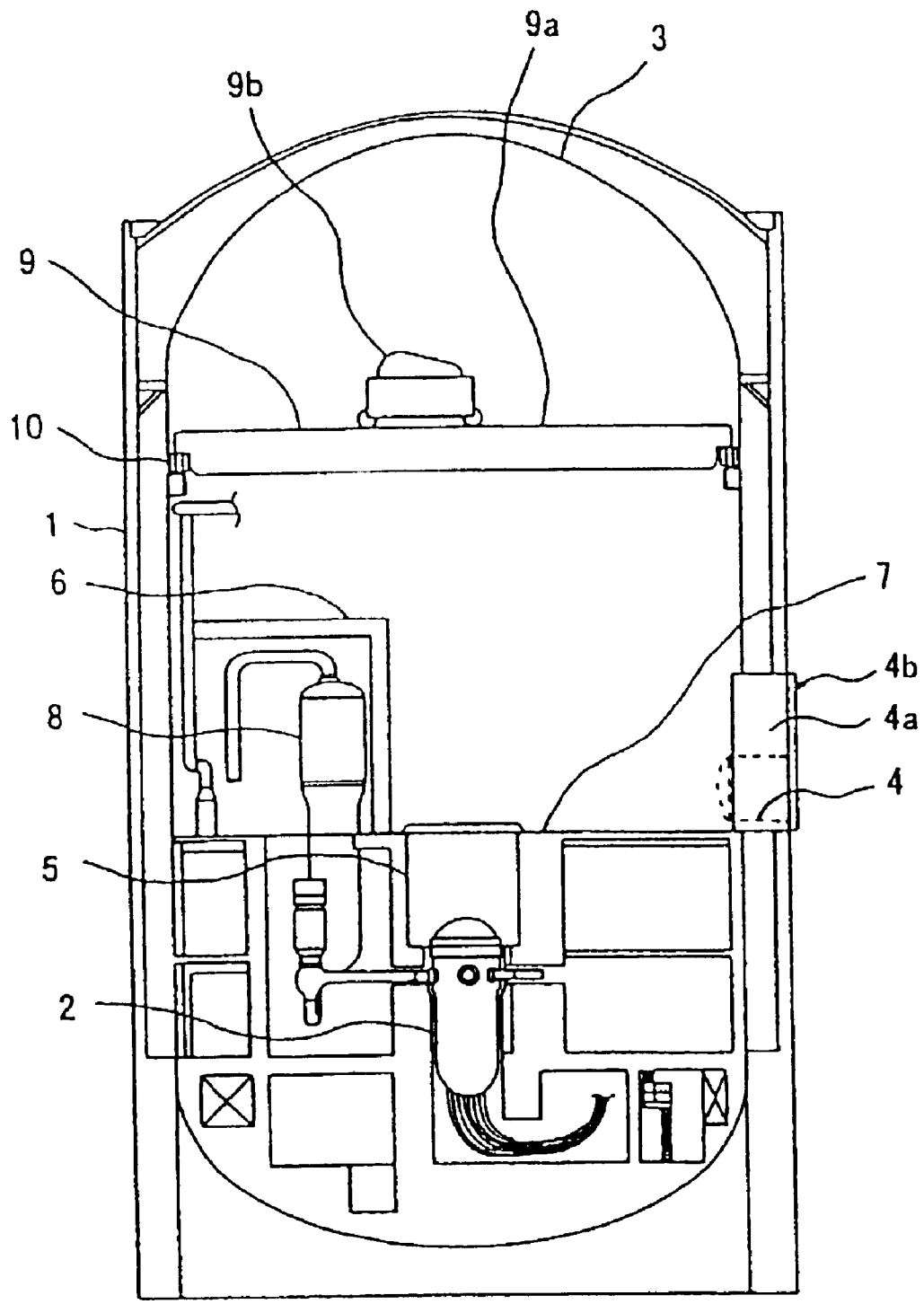
FIG. 18 is a view showing a state in which a temporary opening is formed in a side wall of a containment vessel.

In step T9, a temporary opening 4a is formed so as to penetrate side walls of a CV 3 and a reactor shielding building having 1, the temporary opening 4a having a size allowing a large-size block 51 including an RV 2 to be carried out through it in a horizontally laid state. FIG. 18 shows a state in which the temporary opening 4a enabling the large-size block 51 (not shown in FIG. 18) to be carried out therethrough is formed in the side wall of the CV 3 at a level above an operating floor 7.

Although an equipment carrying-in opening 4 is provided in the CV 3 for carrying out/in large-size equipment through it, the size of the equipment carrying-in opening 4 is not enough to carry out the large-size block 51 including a radiation shield 28 and the RV 2, as described above.

Therefore, the temporary opening 4a is newly formed so as to penetrate both the CV 3 and the reactor building 1. A shutter 4b capable of opening and closing is provided to close the temporary opening 4a. The temporary opening 4a may be formed at a different position from the equipment carrying-in opening 4, but the term necessary for the work can be cut down by enlarging the existing equipment carrying-in opening 4 to such an extent that the temporary opening 4a is formed.

Figure 19:
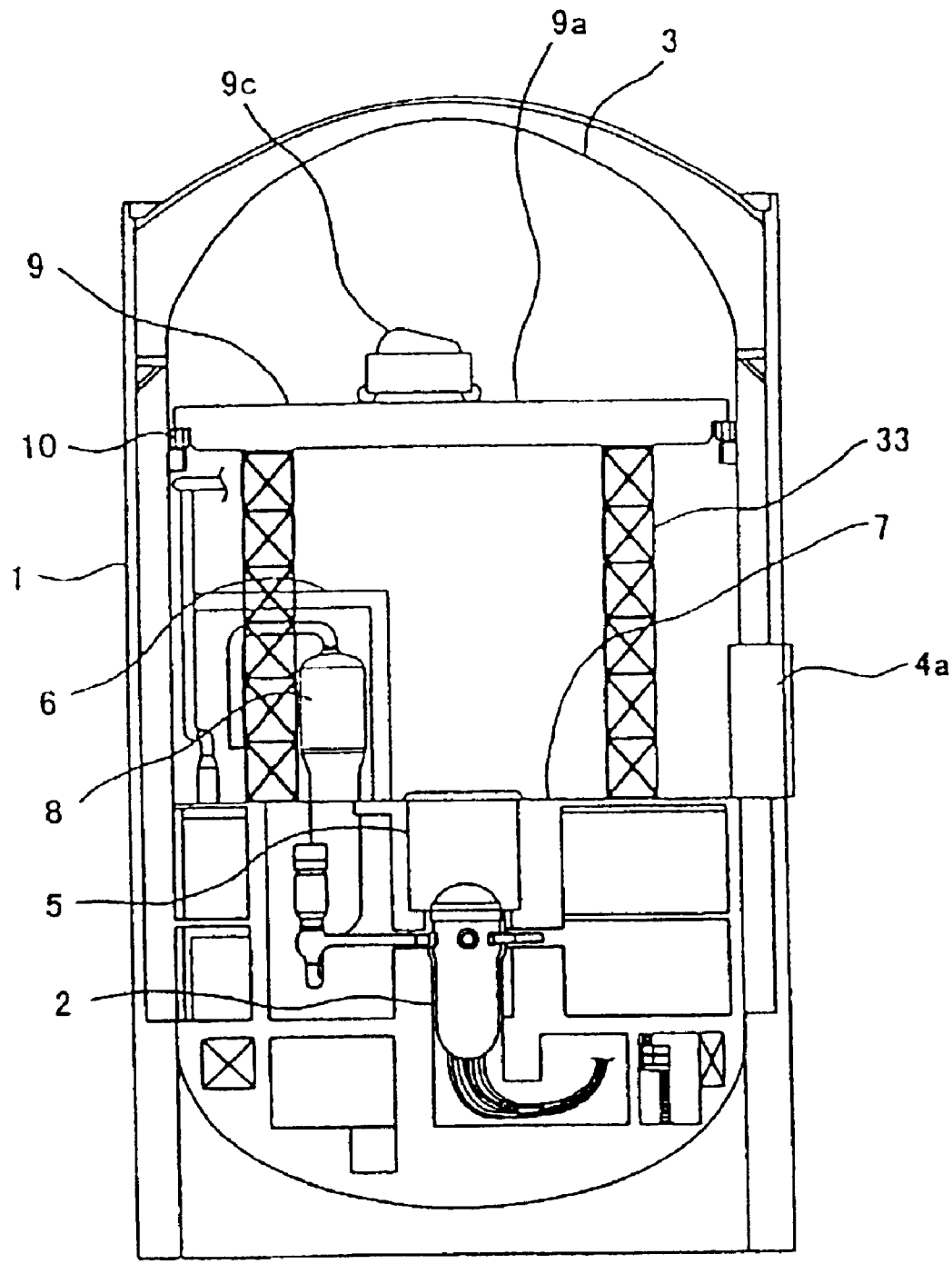
FIG. 19 is a view showing a state in which a polar crane is reinforced.

Then, in step T10, a polar crane 9 is reinforced. The existing polar crane has a capacity of about 100 tons. On the other hand, the weight of the large-size block 51 including core internals 50, the RV 2 and the radiation shield 28 amounts to 400 to 500 tons. For that reason, the polar crane 9 is reinforced to be capable of lifting up the large-size block 51 having such a large weight. FIG. 19 shows a state in which the polar crane 9 is reinforced by erecting reinforcing members 33 on the operating floor 7 in the CV 3. The reinforcing members 33 may be provided with pulleys or the likes so that the reinforcing members are able to freely move on the operating floor 7 in conjunction with the polar crane 9.

Then, in step T11, an auxiliary trolley 9c with a reinforced lifting apparatus is mounted. More specifically, the auxiliary trolley 9c comprising a chain jack (or a hydraulic jack, etc.), which has a capacity capable of lifting up the large-size block with the weight of 400 to 500 tons, is mounted on a girder 9a.

Then, in step T12, the radiation shield 28 is carried in through the temporary opening 4a. As with step S12 in the first embodiment, the radiation shield 28 is temporarily placed on the RV 2 (or reinforcing members 27) in a bottom portion of a reactor cavity 5. The radiation shield 28 is provided with a tilting down shaft 28g, which is similar to that shown in FIGS. 15A and 15B, for tilting down the RV 2.

Then, in step T13, the RV 2 and the radiation shield 28 are combined with each other. The RV 2 is lifted up by the reinforced polar crane 9. As with step S13 in the first embodiment, the RV 2 and the radiation shield 28 can be easily united into one in a short time by just lifting up the RV 2 to such an extent that a shield lid 26 of the RV 2 is brought into abutment with a shield upper lid 28a.

Then, in step T14, a flatcar (trailer) 34a provided with a tilting-down bearing 35 is carried into the CV 3 and set up on the operating floor 7 for tilting down the RV 2.

Figure 20:
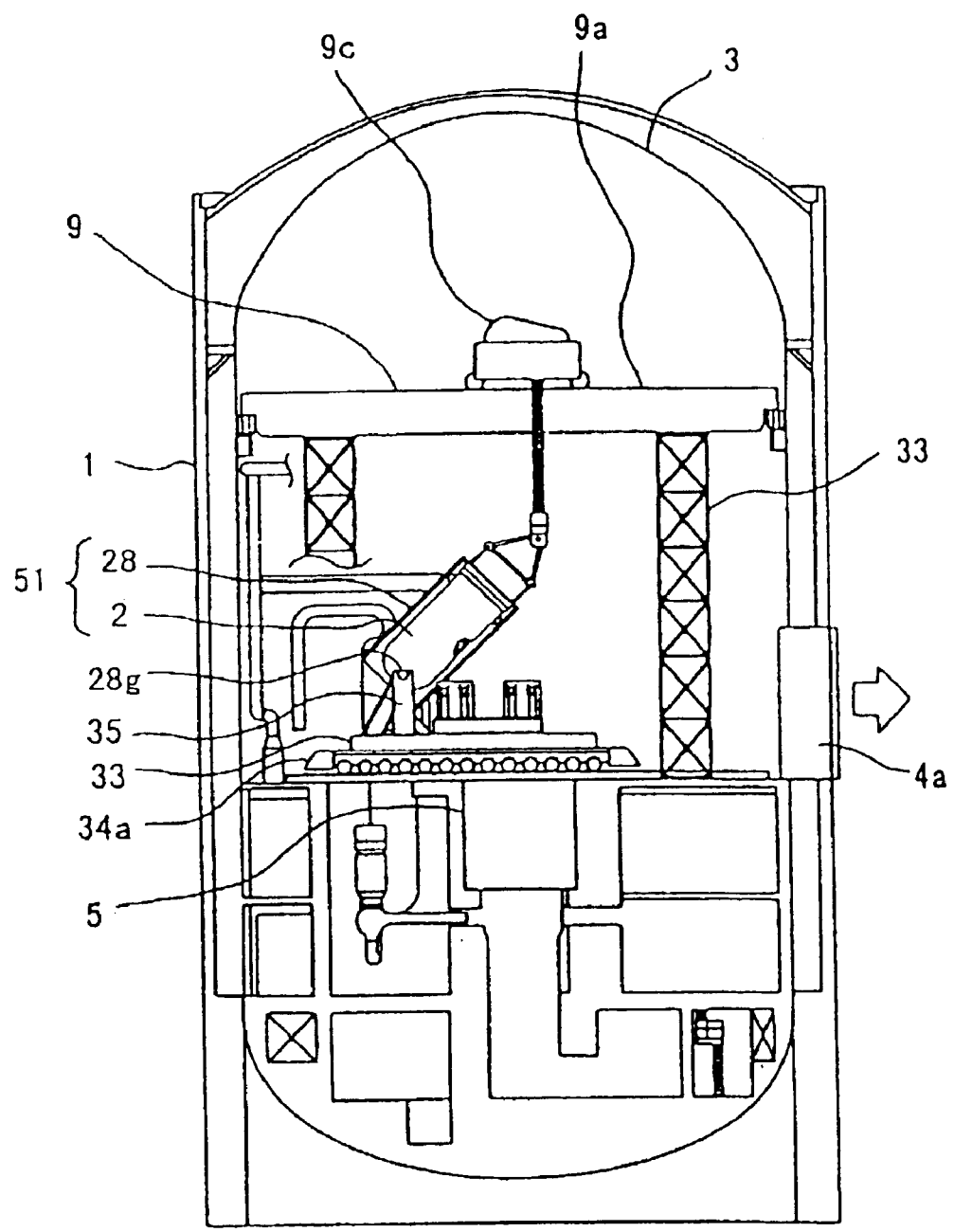
FIG. 20 is a view showing a state in which the large-size block is tilted down in the containment vessel to be laid on a flatcar.

Then, in step T15, the large-size block 51 including the RV 2 combined with the radiation shield 28 is tilted down. The tilting-down of the large-size block 51 is performed in a similar manner as described above in connection with FIGS. 15A and 15B. FIG. 20 is a view showing a state in which the large-size block 51 is tilted down in the CV 3 to be laid on the flatcar 34a.

Then, in step T16, the large-size block 51 in a state of being horizontally laid on the flatcar 34a is carried out of the reactor shielding building 1 through the temporary opening 4a. In step T17, while keeping the large-size block 51 horizontally laid on the flatcar 34a, the large-size block 51 is transported to a storage container 40 for the RV 2, which is installed in, e.g., the nuclear power plant site, and then carried into the storage container 40.

Then, in step T18, a new reactor vessel (new RV) 2 is carried into the CV 3 through the temporary opening 4a by using the flatcar 34a. After carrying the new RV 2 into the CV 3, the new RV 2 is tilted up by the reinforced polar crane 9 in accordance with the procedure reversal tot that in step T15. Further, the new RV 2 is lifted up by the reinforced polar crane 9 and is installed in the reactor cavity 5.

Then, the reinforcing members 33 and the auxiliary trolley 9c for the polar crane 9 are removed in step T19, and the temporary opening 4a is closed in step T20. Subsequent steps T21 to T25 are performed in the same manners as in steps S20 to S24 shown in FIGS. 1A and 1B. The work for carrying out the large-size block 51, which includes the core internals 50, the RV 2 and the radiation shield 28 united into one, and the work for carrying the new RV 2 are thereby completed.

With this embodiment, carrying-out and -in of the reactor vessel can be implemented in a short time with high efficiency by using the reinforced polar crane. It is therefore possible to shorten the term of work for replacing the reactor vessel and hence to shorten the downtime of the nuclear power plant. Further, as with the first embodiment, when carrying out the reactor vessel, the surface dose rate of the shield for the reactor vessel can be reduced to a level lower than the limit value, and the radiation exposure rate of workers can be reduced.

What is claimed is:

1. A reactor vessel handling method comprising the steps of reinforcing an overhead traveling crane installed above a reactor vessel in a reactor containment vessel of a pressurized water reactor containing said reactor vessel by supporting said overhead traveling crane with reinforcing members installed in said reactor containment vessel, lifting said reactor vessel from said reactor containment vessel up to an operating floor in said reactor containment vessel by using the reinforced overhead traveling crane, tilting down said reactor vessel at said operating floor, and then carrying out said reactor vessel in the state of being tilted-down through an opening provided in a side wall of said reactor containment vessel to the outside of said reactor containment vessel.

2. A reactor vessel handling method according to claim 1, wherein an equipment carrying-in opening in said reactor containment vessel is enlarged and utilized as said opening.

3. A reactor vessel handling method comprising the steps of reinforcing an overhead traveling crane installed above a reactor vessel in a reactor containment vessel of a pressurized water reactor containing said reactor by supporting said overhead traveling crane with reinforcing members installed in said reactor containment vessel, lifting said reactor vessel from said reactor containment vessel up to an operating floor in said reactor containment vessel by using the reinforced overhead traveling crane, tilting down said reactor vessel at said operating floor, and carrying out said reactor vessel in the state of being tilted-down through an opening provided in a side wall of said reactor containment vessel to the outside of said reactor containment vessel; and then carrying in a new reactor vessel in a state of being tilted-down to said operating floor within said reactor containment vessel through said opening, and moving said new reactor vessel in a state of being tilted-up from said operating floor to said installed position by using said reinforced overhead traveling crane.

4. A reactor vessel handling method comprising the steps of, in a state in which an overhead traveling crane installed above a reactor vessel in a reactor containment vessel of a pressurized water reactor containing said reactor vessel is reinforced by supporting the overhead traveling crane with reinforcing members installed in said reactor containment vessel, carrying in a new reactor vessel in a state of being tilted-down to said operating floor within said reactor containment vessel through an opening provided in a side wall of said reactor containment vessel, and moving said new reactor vessel in a state of being tilted-up from said operating floor to an installed position of said new reactor vessel in said reactor containment vessel by using said reinforced overhead traveling crane.

5. A reactor vessel handling method according to claim 4, wherein said reinforcing members for said overhead traveling crane are removed after moving said new reactor vessel to said installed position.

6. A reactor vessel handling method according to claim 1, wherein said reinforcing members are installed to said operating floor.

7. A reactor vessel handling method according to claim 1, wherein said tilting-down of the reactor vessel is carried out such that the reactor vessel is tilted along with a radiation shield surrounding said reactor vessel.

8. A reactor vessel handling method according to claim 1, wherein said tilting-down of the reactor vessel is carried out on a car set up on said operating floor, and said carrying-out of the reactor vessel is carried out by using said car.

9. A reactor vessel handling method according to claim 8, wherein said tilting-down of the reactor vessel is carried out such that the reactor vessel is tilted along a radiation shield surrounding said reactor vessel.

10. A reactor vessel handling method according to claim 9, wherein said tilting-down of the reactor vessel is carried out by engaging a shaft attached to said radiation shield as a center of rotation with a shaft bearing member provided on said car.

11. A reactor vessel handling method according to claim 3, wherein said reinforcing members are installed on said operating floor.

12. A reactor vessel handling method according to claim 3, wherein said tilting-down of the reactor vessel is carried out such that the reactor vessel is tilted along with a radiation shield surrounding said reactor vessel.

13. A reactor vessel handling method according to claim 3, wherein said tilting-down of the reactor vessel is carried out on a car set up on said operating floor, and said carrying-out of the reactor vessel is carried out by using said car.

14. A reactor vessel handling method according to claim 13, wherein said tilting-down of the reactor vessel is carried out such that the reactor vessel is tilted along with a radiation shield surrounding said reactor vessel.

15. A reactor vessel handling method according to claim 14, wherein said tilting-down of the reactor vessel is carried out by engaging a shaft attached to said radiation shield as a center of rotation with a shaft bearing member provided on said car.

16. A reactor vessel handling method according to claim 3, wherein said carrying-in of the new reactor vessel is carried out by laying said new reactor vessel on said car.

17. A reactor vessel handling method according to claim 4, wherein said reinforcing members are installed on said operating floor.

18. A reactor vessel handling method according to claim 4, wherein said carrying-in of the new reactor vessel is carried out by laying said new reactor vessel on a car.

* * * * *